H. LEINEWEBER.
AIRSHIP.
APPLICATION FILED NOV. 13, 1909.
1,064,232.
Patented June 10, 1913.
14 SHEETS—SHEET 1.
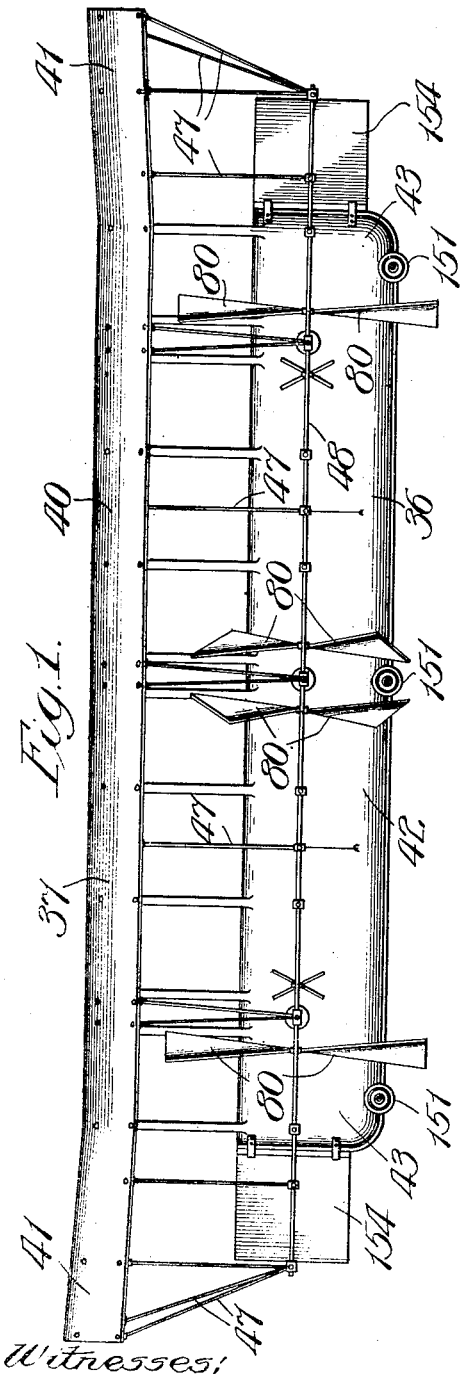
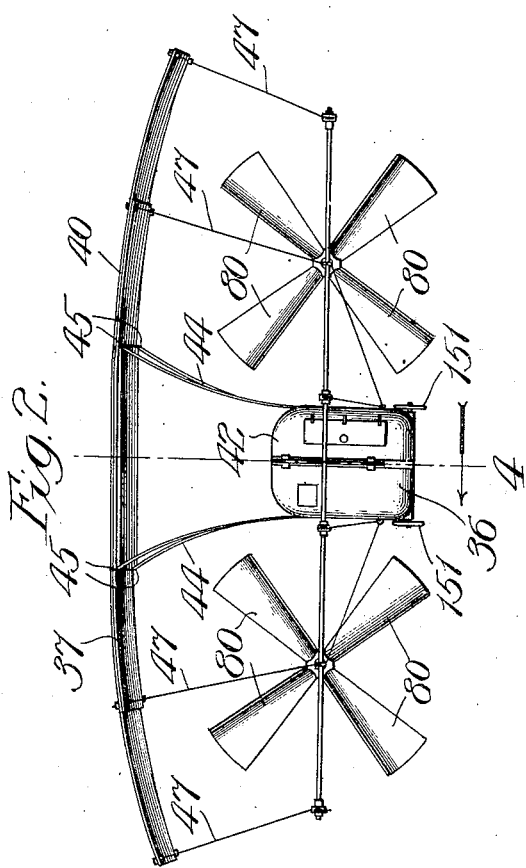
Witnesses:
John Enders
Chas H Buell
Inventor:
Herman Leineweber
By Dyrenforth, Lee, Chritton & Wiles
Attys.

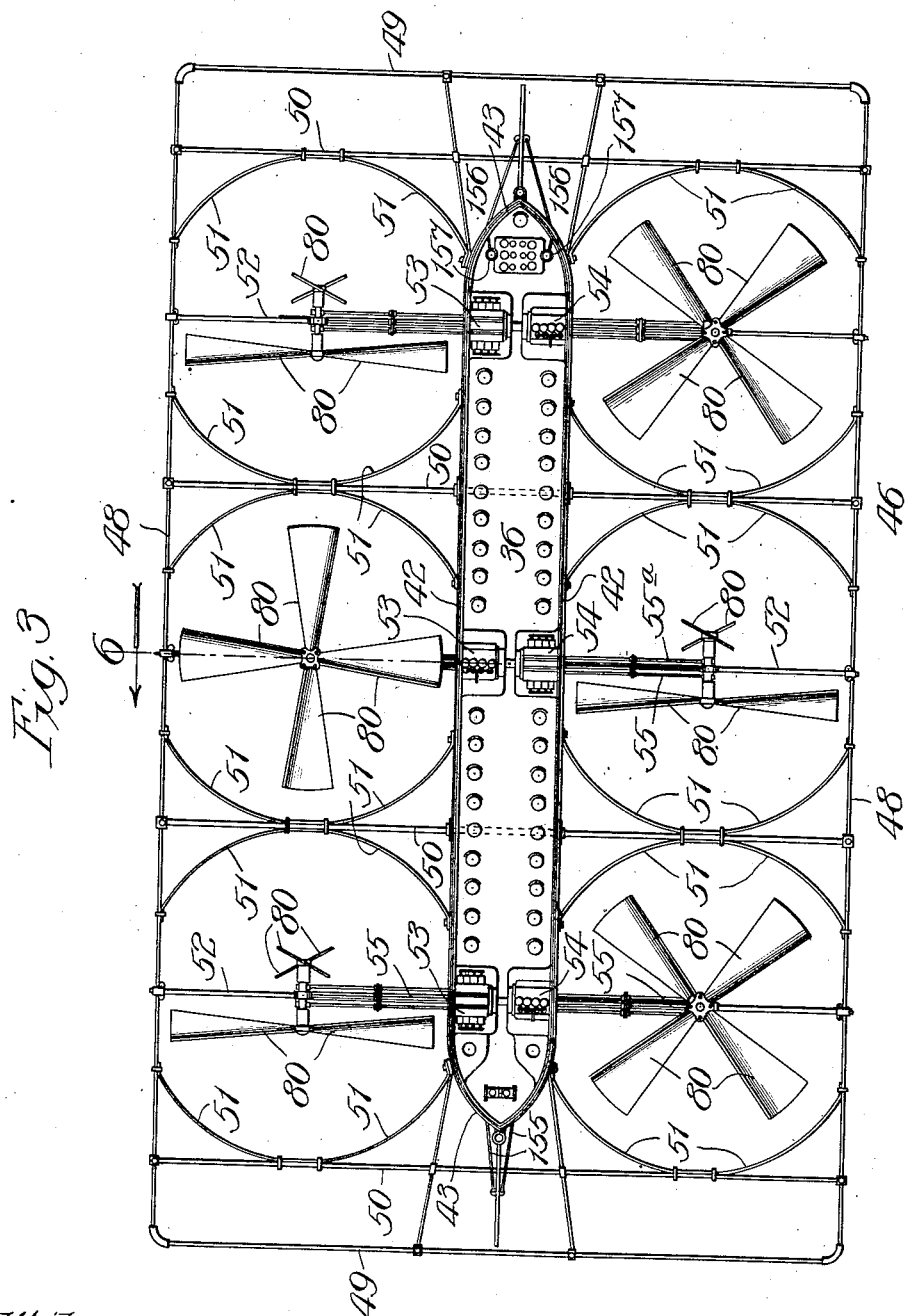

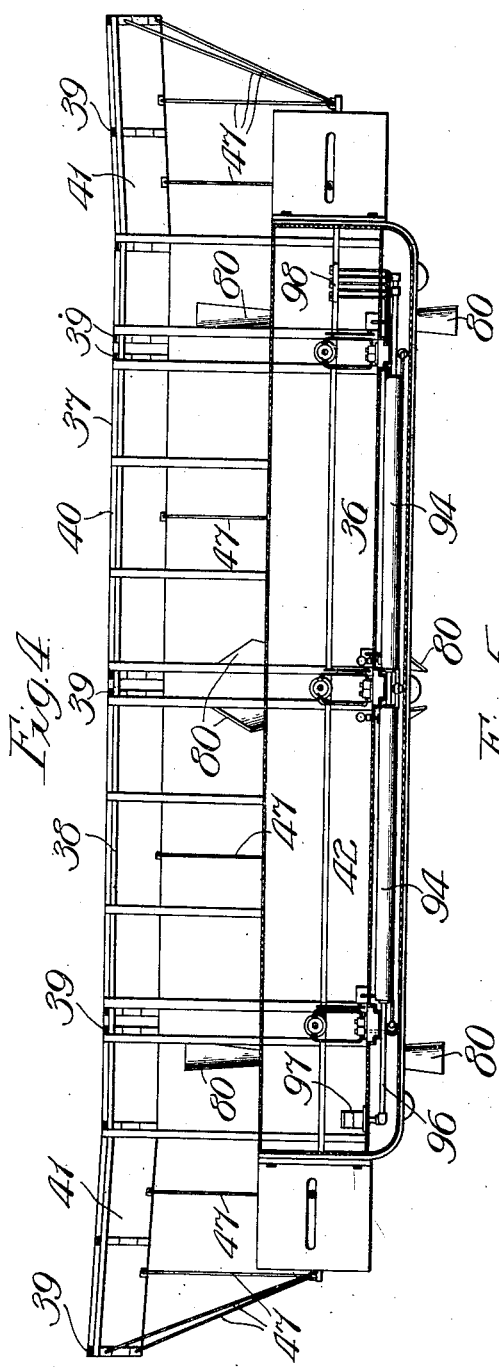

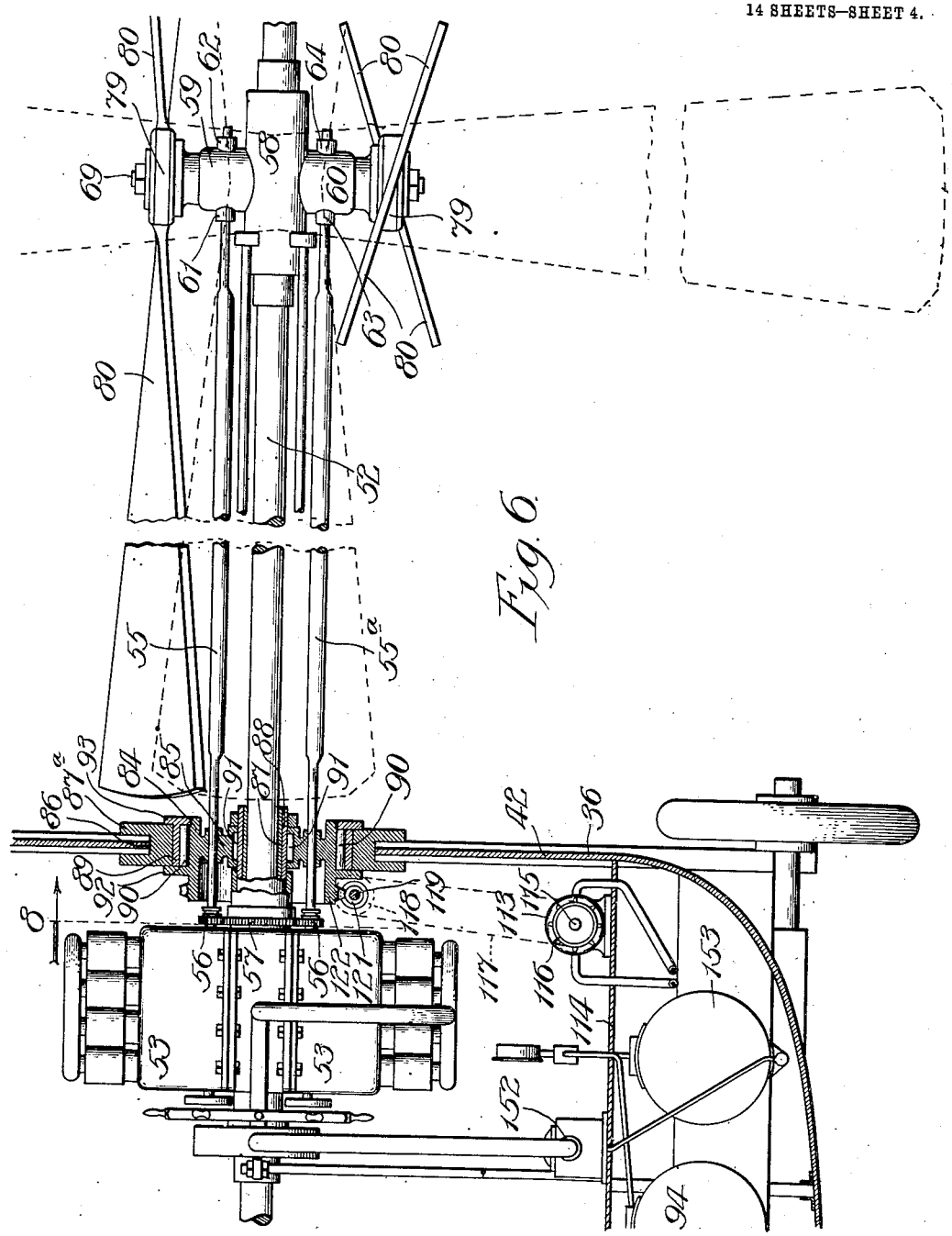

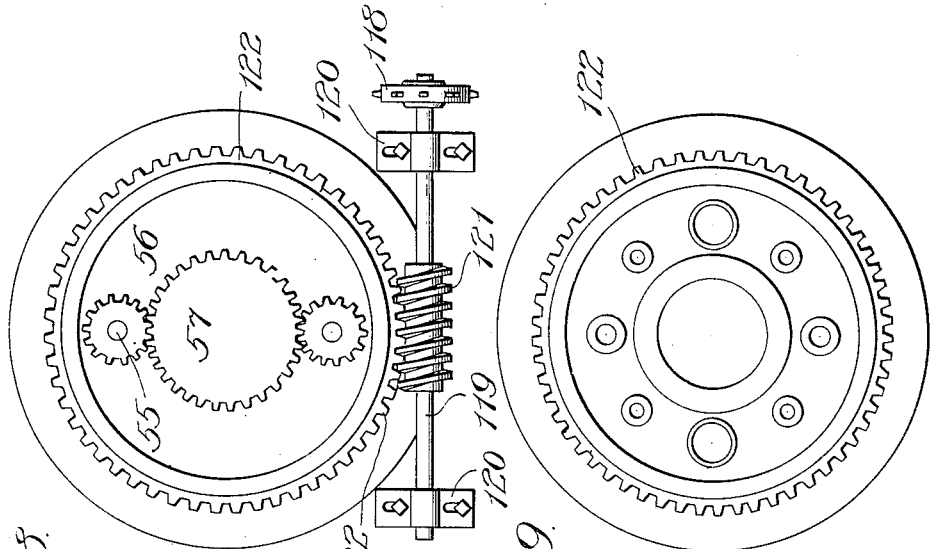
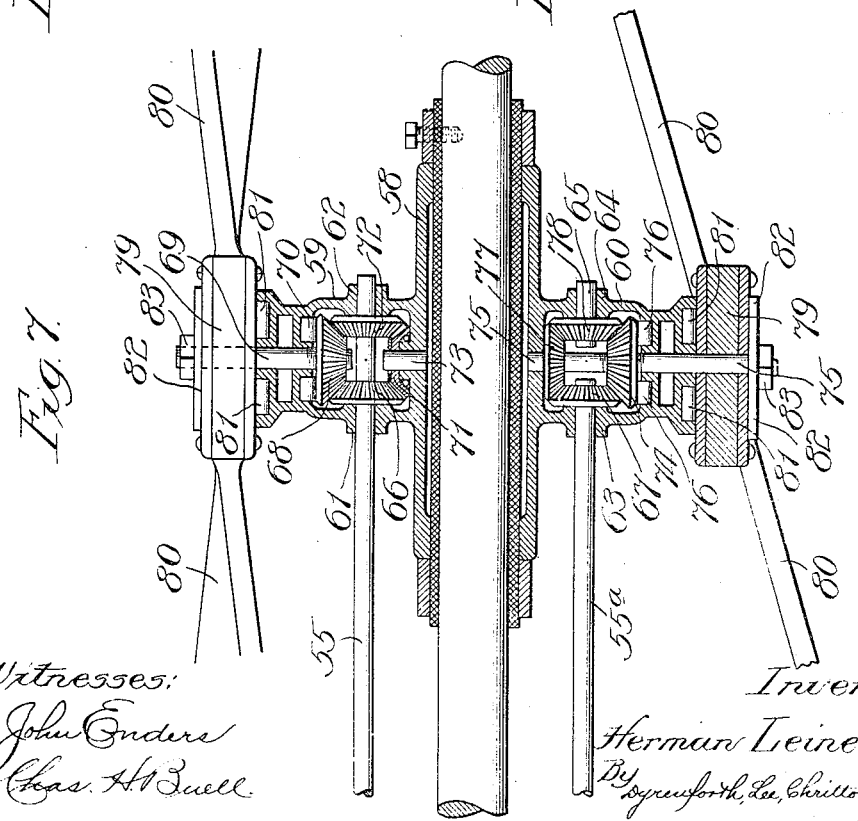

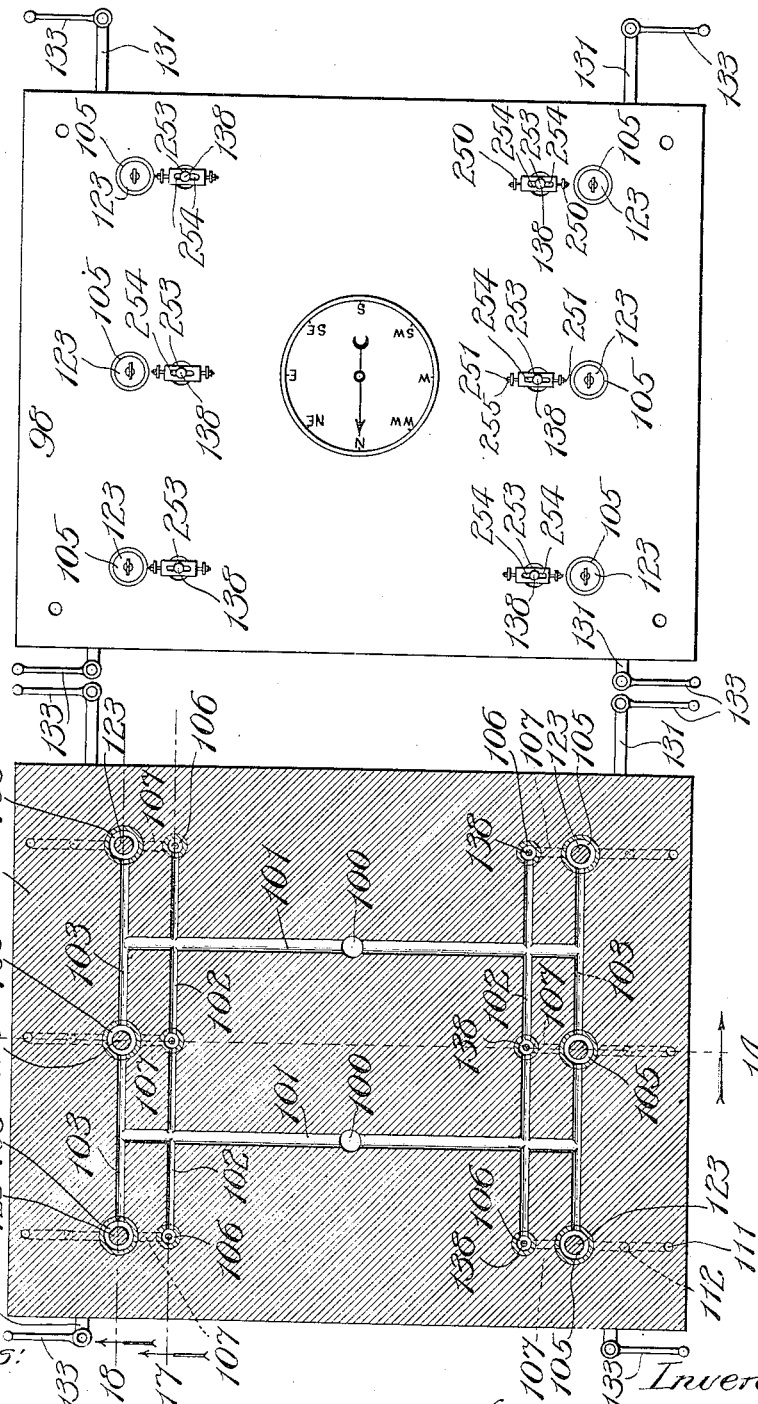

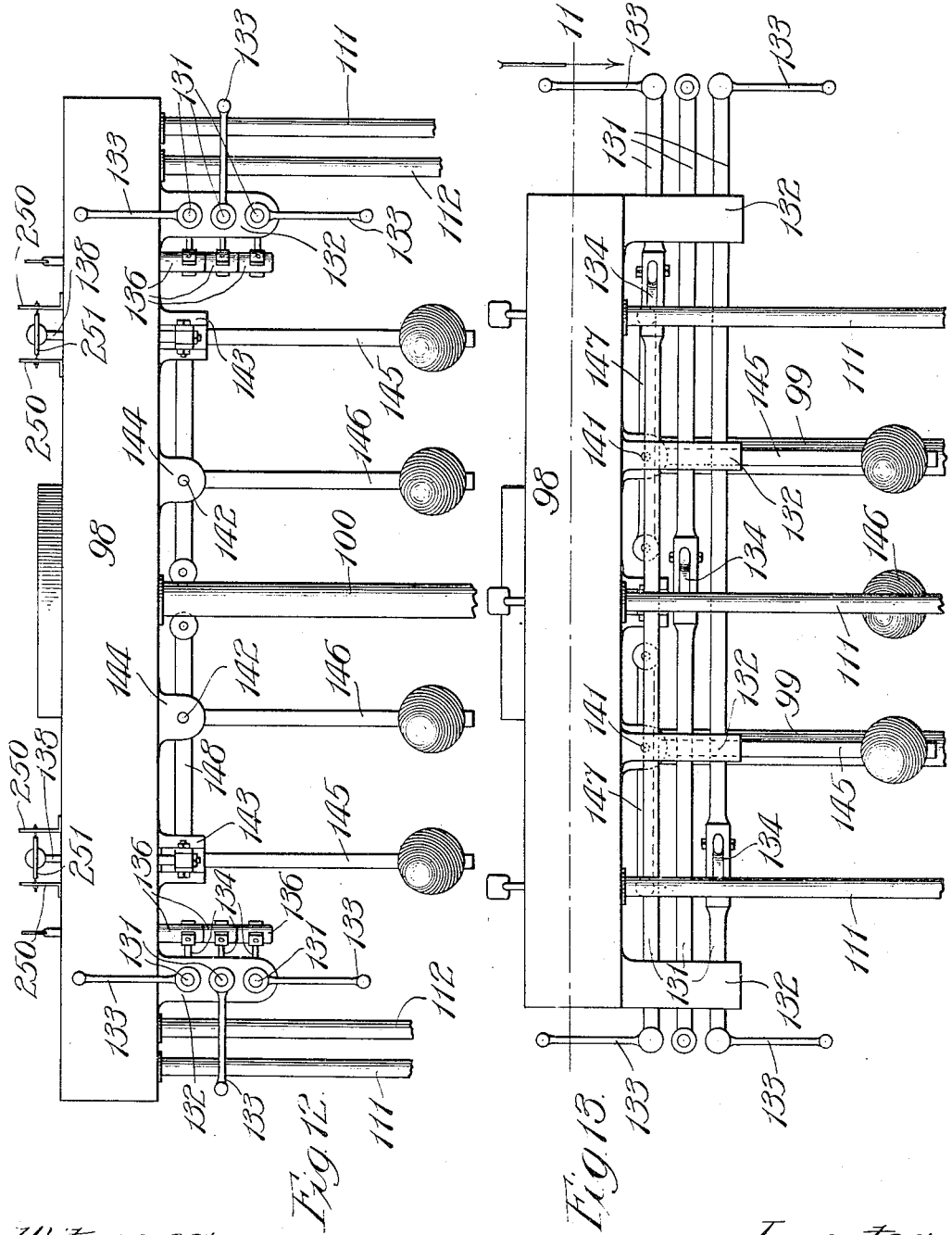

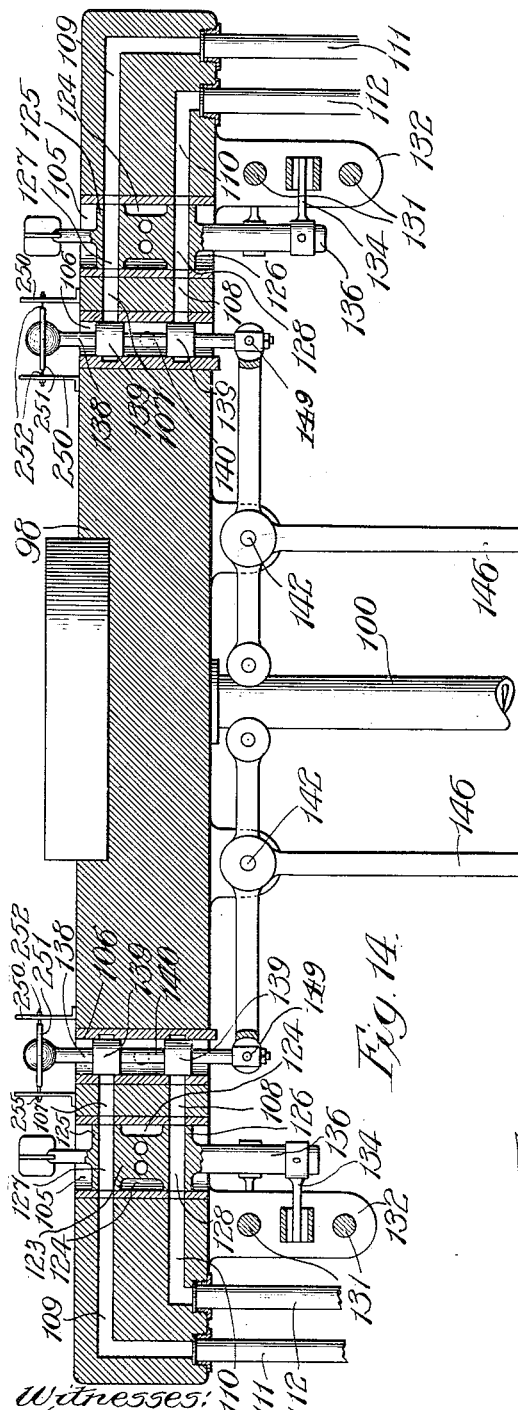

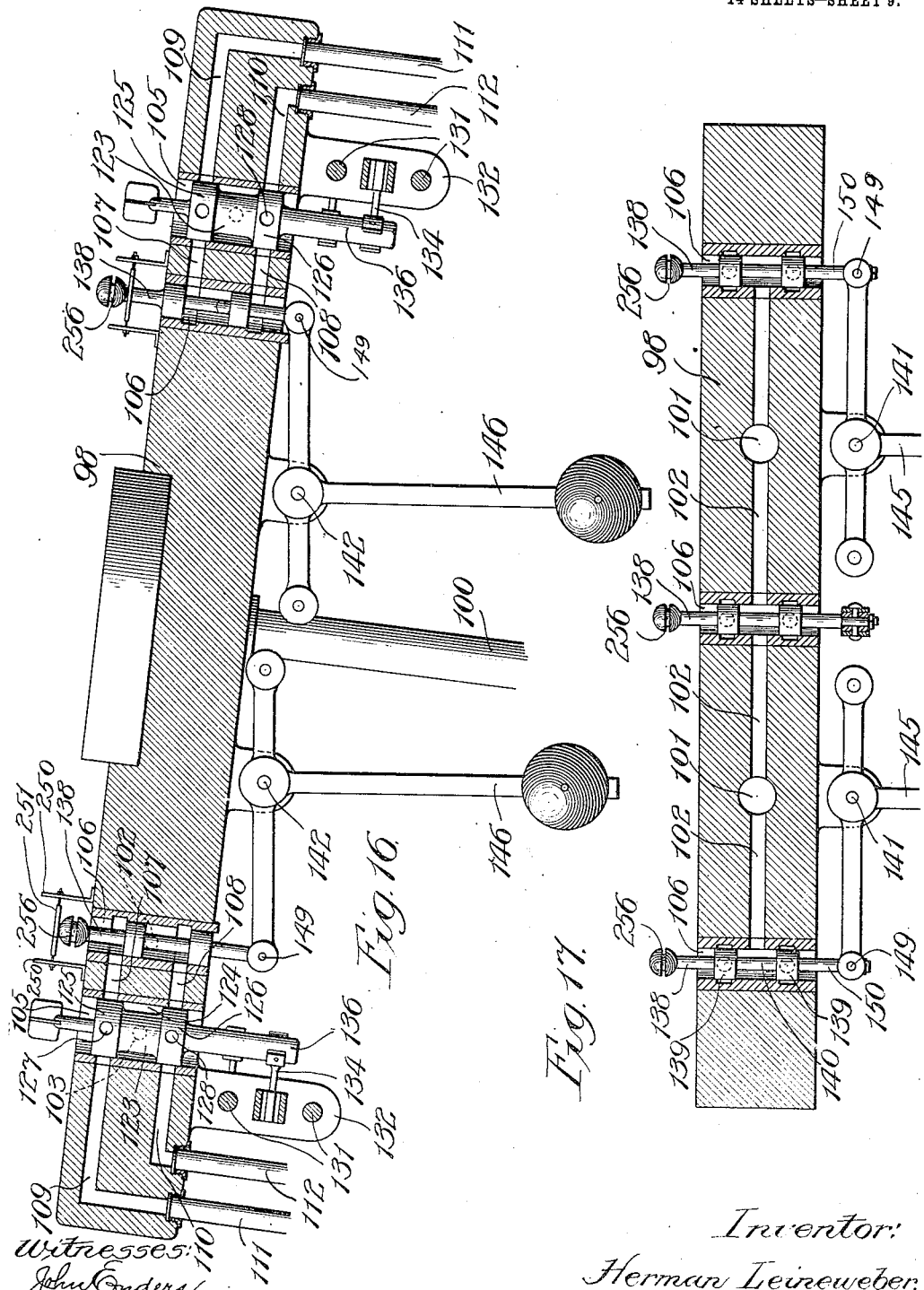

H. LEINEWEBER.
AIRSHIP.
APPLICATION FILED NOV. 13, 1909.
1,064,232.
Patented June 10, 1913.
14 SHEETS—SHEET 10.
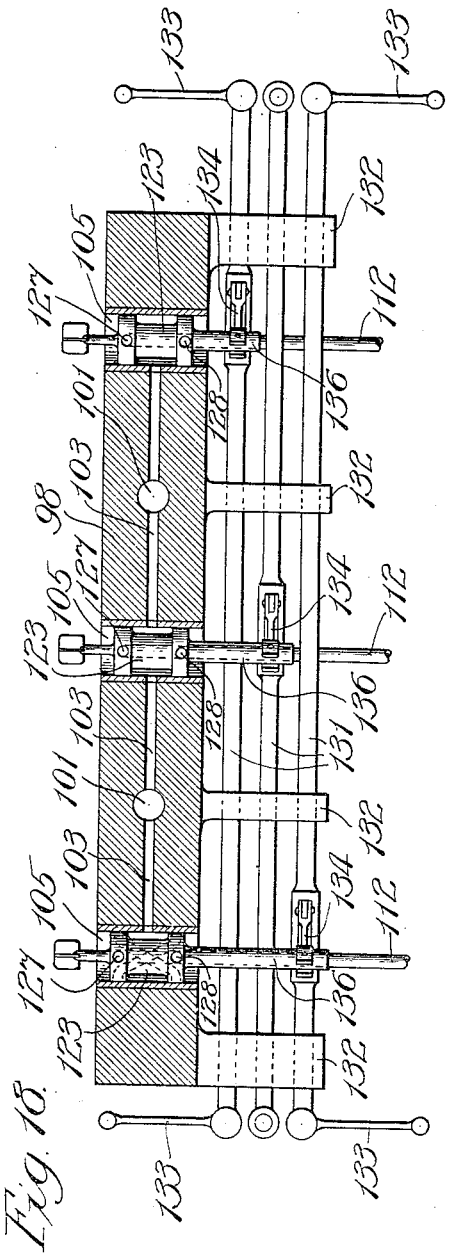
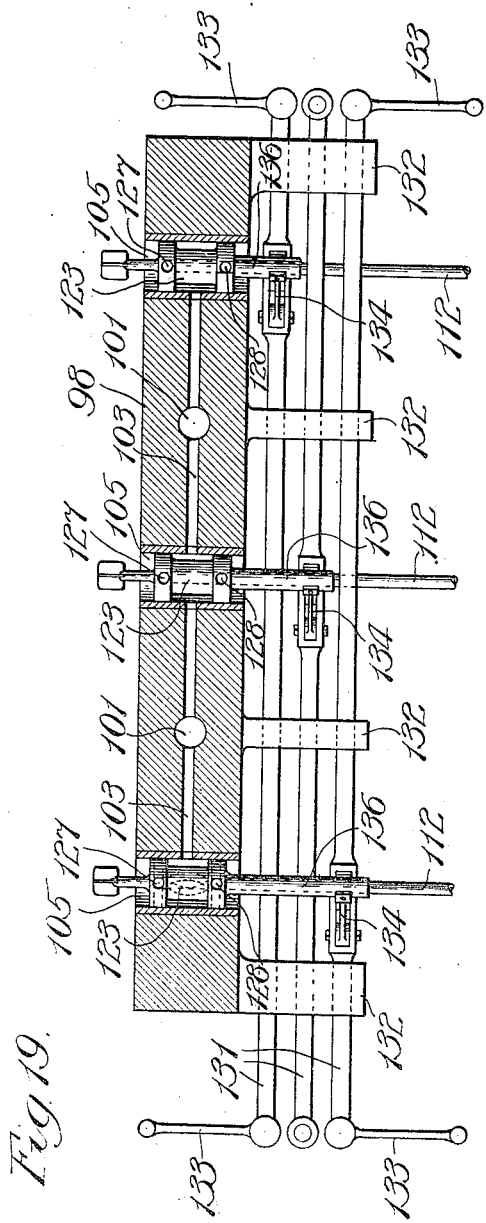
Witnesses:
John Enders
Chas. H. Buell
Inventor:
Herman Leineweber
By Dyrenforth, Lee, Chritton & Wiles,
Attys.

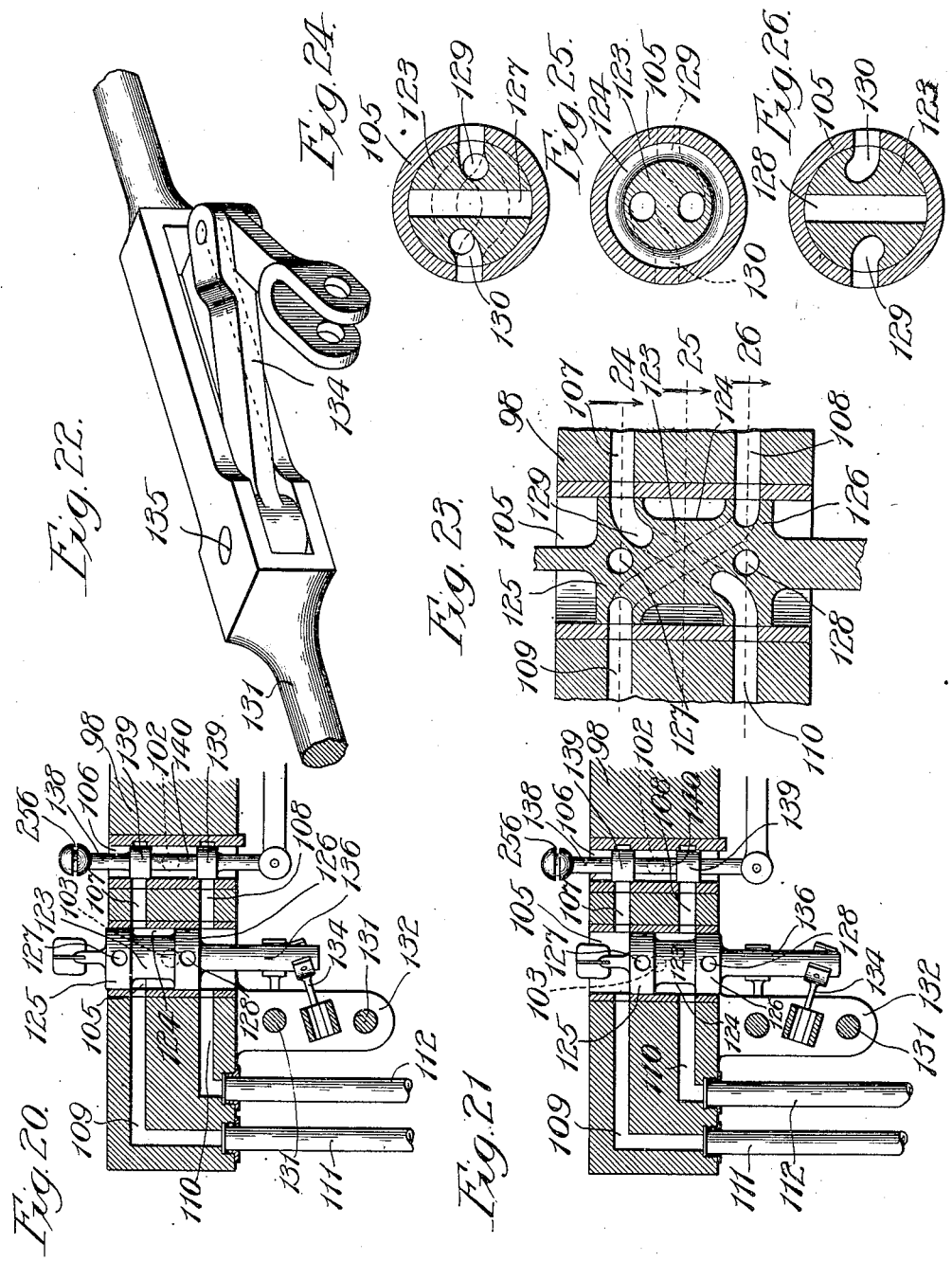

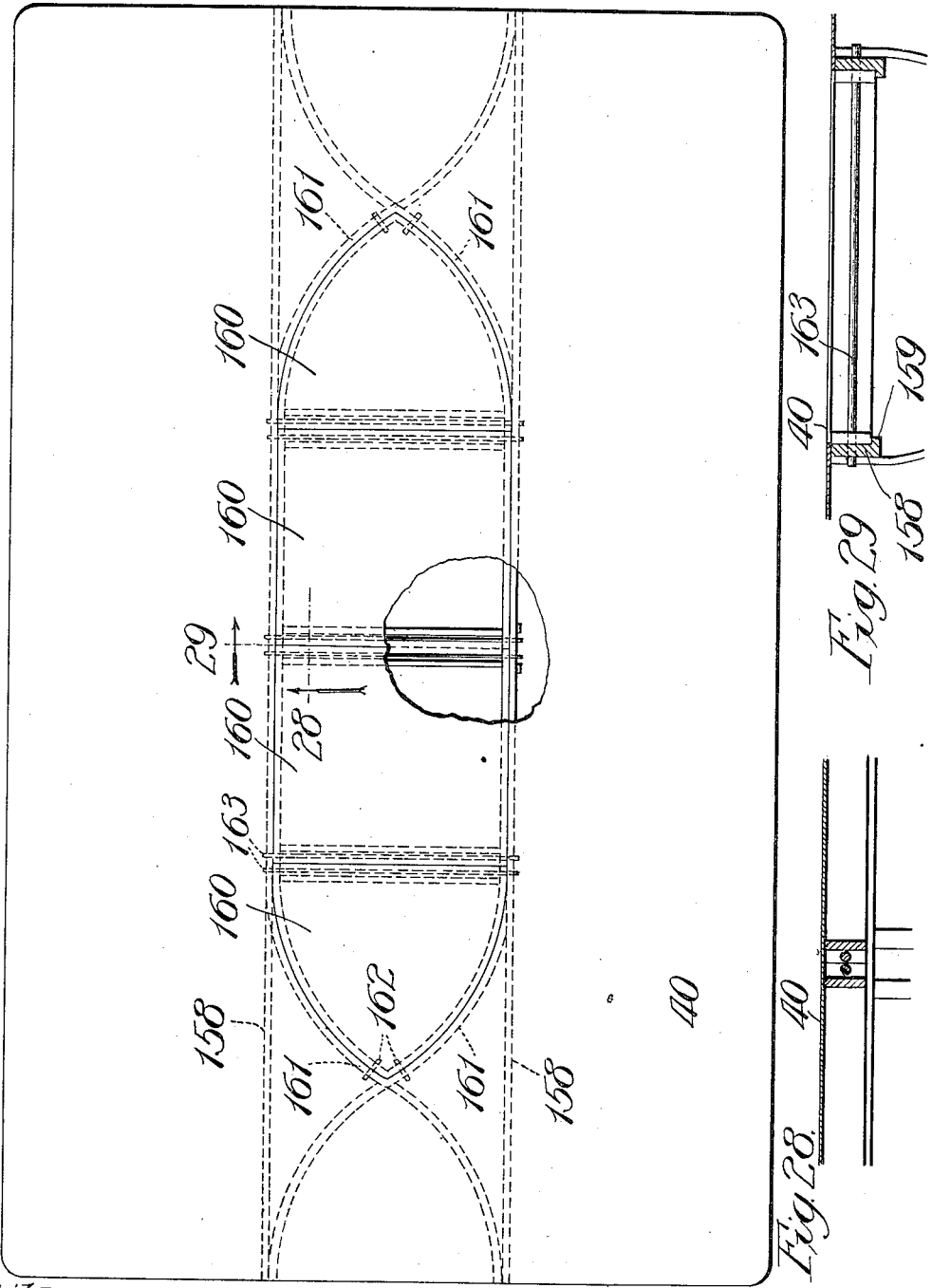

H. LEINEWEBER.
AIRSHIP.
APPLICATION FILED NOV. 13, 1909.
1,064,232.
Patented June 10, 1913.
14 SHEETS—SHEET 13.
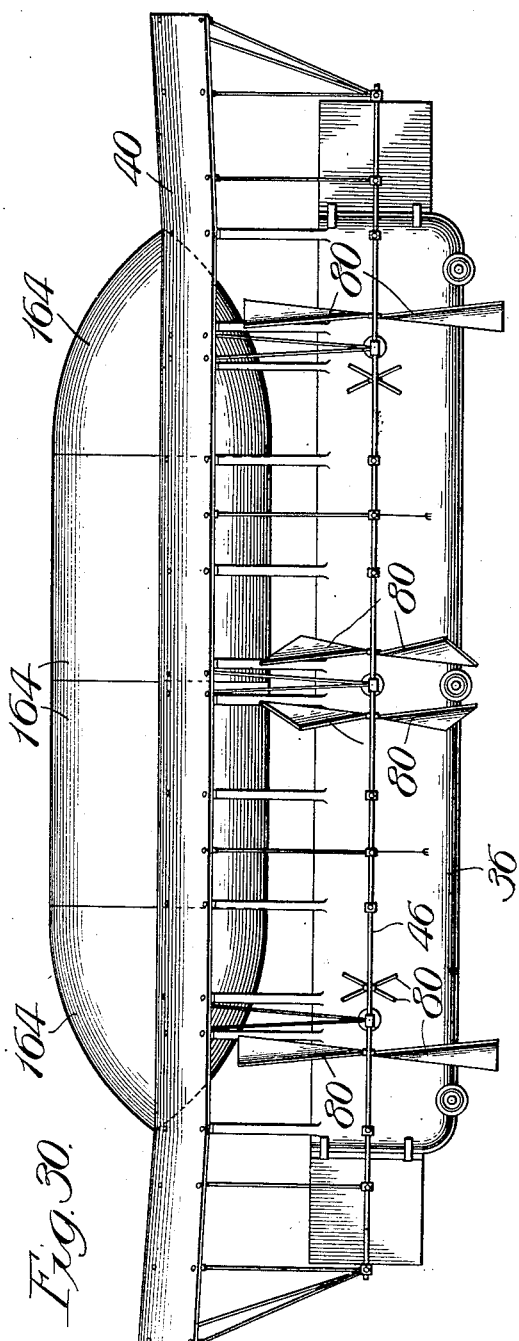
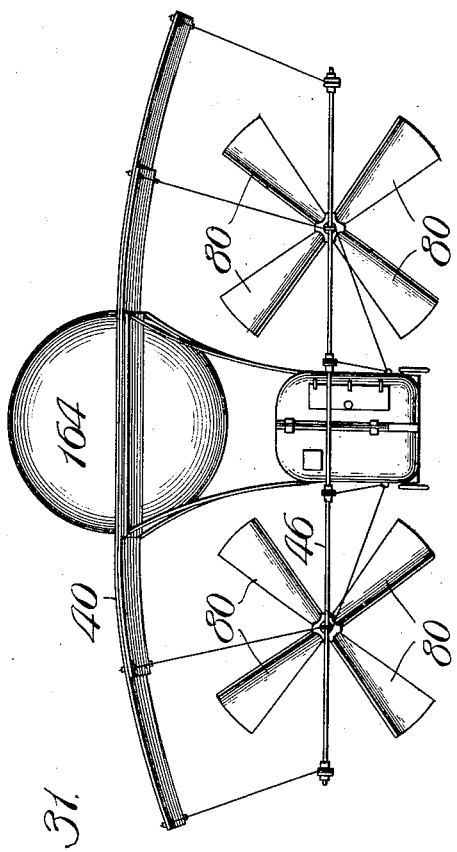

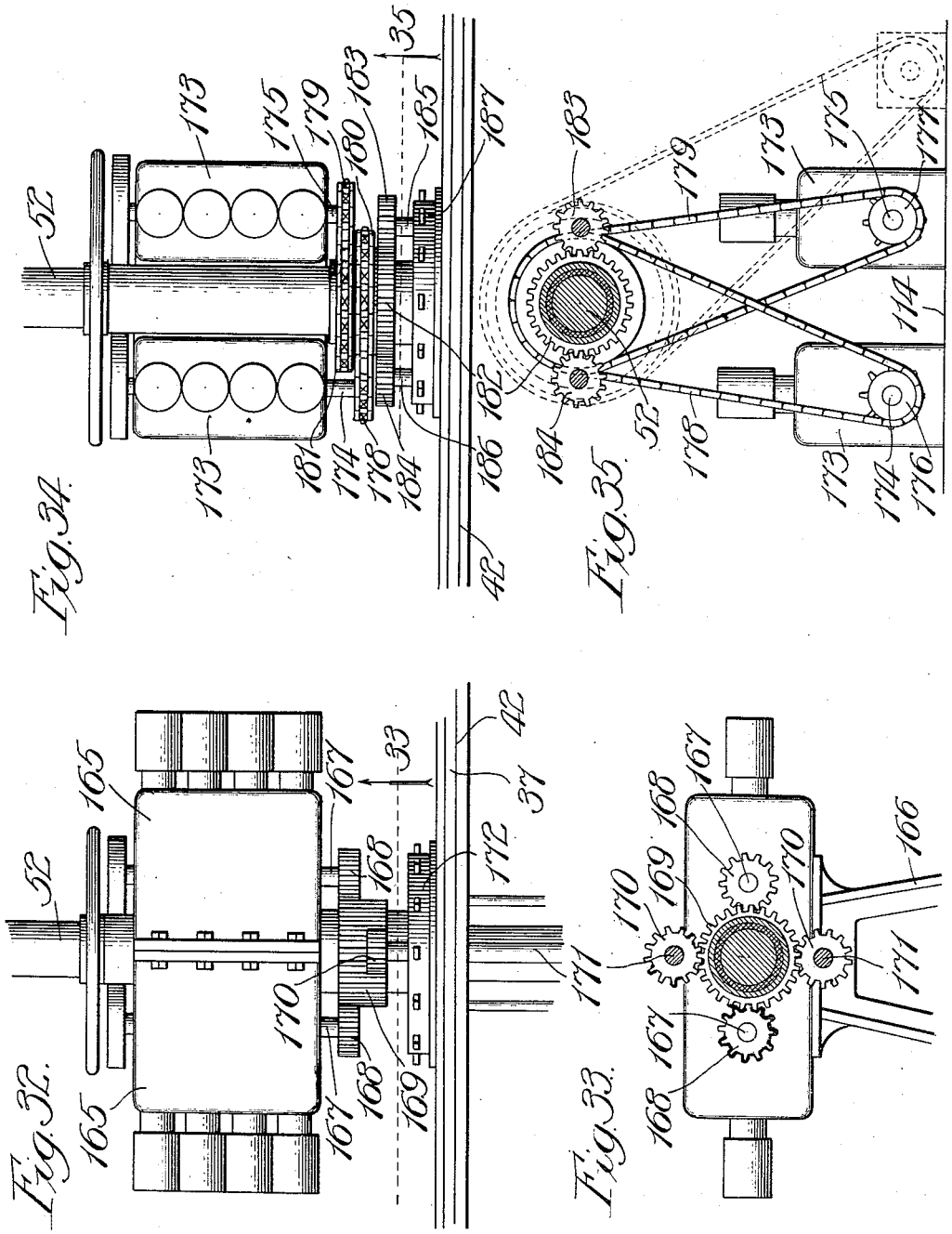

UNITED STATES PATENT OFFICE.

HERMAN LEINEWEBER, OF SOUTH CHICAGO, ILLINOIS.

AIRSHIP.

1,064,232.            Specification of Letters Patent.      Patented June 10, 1913.

Application filed November 13, 1909. Serial No. 527,784.

*To all whom it may concern:*

Be it known that I, HERMAN LEINEWEBER, a citizen of the United States, residing at South Chicago, in the county of Cook and State of Illinois, have invented a new and useful Improvement in Airships, of which the following is a specification.

My invention relates to air-ships of the type involving the use of propellers for producing propulsion of the machine. Airships of this variety as hitherto constructed present the main objection of instability when in the air due to the absence of means for overcoming the tilting thereof, as when struck by gusts of wind, or when the position of objects in the car is changed, this objection being a serious one as it renders the ship unsafe.

My primary object is to provide in an airship of the type referred to means for maintaining the ship in balanced condition, while traveling through the air under varying conditions, which shall be operative automatically to right the ship in case it tilts from end to end, or laterally, from any one of the various causes which tend to throw the ship out of balance.

Other objects are to provide means under the control of an operator for driving the ship either forward or backward at the desired height from the ground, and for controlling the speed of ascent and descent of the ship; to provide for the independent operation and control of the several propeller mechanisms; and, in general, to provide improvements to the end of rendering the airship safe and easy to steer and control.

Referring to the accompanying drawings—Figure 1 is a view in side elevation of an air-ship of the monoplane type constructed in accordance with my invention. Fig. 2 is a view in end elevation of the construction shown in Fig. 1 viewed from either end. Fig. 3 is a plan view of the machine, in the nature of a diagram, with the plane and top of the car or body removed, showing the several propeller devices in different positions of adjustment relative to the body. Fig. 4 is a view of the machine in longitudinal vertical sectional elevation. Fig. 5 is a diagrammatic view of the fuel-tanks, air-tanks, piping connecting the latter with compressed air-engines for changing the positions of the propeller-means with relation to the body, and showing means for controlling the supply of air to the motors, the constructions shown herein being located in the body, or car, below a false-flooring therein. Fig. 6 is a section taken at the line 6 on Fig. 3 and enlarged, this view showing in elevation and partly in section one of a plurality of similar propeller mechanisms located at the opposite sides of the car. Fig. 7 is a view in vertical sectional elevation of the propellers shown in Fig. 6 and the gear-mechanism by which they are operated. Fig. 8 is a section taken at the line 8 on Fig. 6 and viewed in the direction of the arrow. Fig. 9 is a face view of one of a plurality of similar rotatable rings shown in Fig. 6 affording bearings for the shafts of the propeller-devices and through the medium of which the latter are bodily movable for changing the angle at which they incline with relation to the car. Fig. 10 is a plan view of the air-motor-controlling device or board located in the body of the car. Fig. 11 is a plan sectional view taken at the line 11 on Fig. 13 and viewed in the direction of the arrow. Fig. 12 is a view in elevation either from the front or rear of said board. Fig. 13 is a view in side elevation of the board shown in Figs. 10, 11 and 12, viewed from either side. Fig. 14 is a section taken at the line 14 on Fig. 11 and viewed in the direction of the arrow, the valves therein shown being in position to automatically operate air-motors for maintaining the ship in normally horizontal or balanced condition while the latter is moving in a forward direction. Fig. 15 is a view like that of Fig. 14 showing the valves in position to automatically operate the air-motors for maintaining the ship in balanced condition while the latter is moving in the rearward direction. Fig. 16 is a view like that of Fig. 14 showing the latter carrying the controlling means for the air-motors, tilted laterally, and illustrating the way in which the automatically-operated valves for directing the flow of compressed air to the air-motors are actuated. Fig. 17 is a section taken at the line 17 on Fig. 11 and viewed in the direction of the arrow, showing the automatically-operated valves in normal position. Fig. 18 is a section taken at the line 18 on Fig. 11 and viewed in the direction of the arrow. Fig. 19 is a section taken at the line 18 on Fig. 11, but showing the hand-operated valves for controlling the air-motors at one side of the ship, in position, as to the one in the left-hand side of this figure, to permit of the operation of the automatic air-motor-controlling means when the machine is traveling in a rearward direction. Fig. 20 is a view like that of Fig. 14 showing the left-hand end of the construction therein presented, this view showing the hand-operated valve in a position for permitting air to enter the air-motor controlled thereby for rotating it in one direction; and Fig. 21 is a view like that of Fig. 20, showing this hand-operated valve in position to reverse the flow of air to the air-motor and reverse the direction of movement of the latter. Fig. 22 is a perspective view of one of a number of similar rods for operating the manually-controlled air-valves, showing a toggle-device for connecting the lever to its coöperating valve for moving it longitudinally of its casing or turning it therein. Fig. 23 is a broken vertical section taken through one of a plurality of similar manually-operated air-controlling valves, showing the valve in position for permitting automatic operation of the air-pumps when the ship is traveling in the rearward direction. Figs. 24, 25 and 26 are cross-sections taken through the valve shown in Fig. 23 at the lines 24, 25 and 26, respectively, on this figure and viewed in the directions of the arrows. Fig. 27 is a plan view of a modification of the plane of the ship illustrated in the preceding figures, this modification involving the provision of a gas-bag in connection with the plane for enhancing the lifting action. Figs. 28 and 29 are broken sections taken at the lines 28 and 29, respectively, on Fig. 27 and viewed in the direction of the arrows. Fig. 30 is a view in side elevation of the construction illustrated in Fig. 27; and Fig. 31 is a view in end elevation thereof, viewed from either end. Fig. 32 is a plan view of a stationary engine which may be employed as the propeller-operating means in place of the rotatably mounted engine of the preceding figures, this view showing the gear connections between the engine and propeller-members. Fig. 33 is a section taken at the line 33 in Fig. 32 and viewed in the direction of the arrow. Fig. 34 is a plan view of an engine connected with the propeller-members in a different way from the engines of the preceding figures, to permit the engine to be located a considerable distance to one side of the propeller-shafts; and Fig. 35 is a section taken at the line 35 on Fig. 34 and viewed in the direction of the arrow.

The machine in connection with which I have chosen to illustrate my invention is of the monoplane type, formed with a body or car 36 supported from a plane 37. This plane, which is preferably of rectangular shape, as illustrated, is formed of a series of parallel spaced rods 38 and 39 (Fig. 4) extending longitudinally and transversely of the plane and tied together in any suitable manner, the frame thus provided supporting a covering 40 of any suitable material, such as canvas, though such covering may be made of light-weight plates, if desired. The plane 37 is preferably formed with its longitudinally-extending marginal portions deflected downwardly, as represented in Fig. 2, and has its end-portions, by preference, slightly inclined upwardly from its straight central portion, as indicated at 41, whereby when the ship is propelled through the air, as hereinafter described, these deflected inclined end-portions operate as aeroplanes and thus aid in the lifting action of the propellers, as hereinafter clearly described. The body, or car, 36 is preferably formed of a shell 42 rounded on its under side and having its ends pointed, as represented at 43, (Fig. 3,) to reduce friction thereof in moving through the air. The car is connected with the plane 37 to depend centrally therefrom, with its base parallel therewith, by a series of spaced vertical inwardly-bowed rods 44, which are connected at their upper ends with the plane, as indicated at 45, and at their lower ends with the sides of the car, as illustrated in Fig. 2.

The frame for supporting the propellers is represented at 46, (Fig. 3). This frame is preferably of rectangular shape and formed of tubing supported from the plane 37, to surround the car and extend midway between the top and bottom thereof, by cables 47 (Fig. 1), which are connected with the plane and with the tubing as represented. The frame 46 is preferably formed of parallel side-members 48 and end-members 49 reinforced by transversely-extending rods 50 spaced apart, bow-shaped brace-rods 51 being connected at their ends with the side-members 48 and the car, and intermediate their ends with the cross-rods 50, whereby the whole frame-structure is rigidly tied together and braced; and non-rotary shafts 52, alternating with said cross-rods, are secured at their opposite ends to the frame-members 48, the central ones of the rods 50 and the shafts 52 extending through the sides of the car 36 and serving, in connection with the rods 44 and cables 47, to afford the desired rigidity to the structure. Each of the shafts 52 has journaled upon it, in the car, a pair of engine-casings 53 and 54 spaced apart and disposed at equal distances from the median line of the car, these engine-casings each containing a set of two engines arranged therein diametrically of the shafts upon which the respective casings are supported. Each set of engines, which may be of any suitable construction (as for instance that of the ordinary internal combustion type), rotates shafts 55 and 55ᵃ (Figs.

3 and 6) located on opposite sides of each supporting-shaft 52, each of which shafts 55 and 55ᵃ carries a pinion 56 meshing with an idle-gear 57 journaled on the supporting shaft 52 for insuring the simultaneous operation of the shafts 55 and 55ᵃ of each set at the same speed, it being understood that one of the gears 57 is provided for each set of pinions 56. On the opposite ends of each of the shafts 52 sleeves 58 are journaled, (Fig. 7,) each of these sleeves being provided with hollow lateral extensions 59 and 60, the opposed walls of the extensions 59 affording bearings 61 and 62 for the outer ends of the shafts 55, and the opposed walls of the extensions 60 forming bearings 63 and 64 for the outer ends of the shafts 55ᵃ and stub-shafts 65. The outer ends of the shafts 55 and 55ᵃ are provided with bevel pinions 66 and 67 located in the interior of the extensions 59 and 60, respectively, the pinions 66, which are fixed on the shafts 55, meshing with similar beveled gears 68 secured on the inner ends of shafts 69 journaled in the extensions 59 and extending at right angles to the shafts 55, the pinions 68 bearing at their flat faces against roller-bearings 70 confined in these extensions, beveled-gears 71 journaled on stub-shafts 73 secured in and extending laterally of the sleeves 58 and similar gears 72 journaled on the outer ends of the shafts 55, respectively, meshing with each other and with the pinions 66 and 68. The pinions 67 fixed on the shaft 55ᵃ mesh with similar beveled pinions 74 fixed on the inner ends of stub-shafts 75 journaled in the extensions 60 to extend at right-angles to the shafts 52 and bear against rollers 76 in these extensions, the pinions 67 and 74 meshing, respectively, with beveled idle pinions 77 and 78 loosely journaled on the shafts 75 and stub-shafts 65. The outer ends of the shafts 69 and 75 carry the coöperating members of the propellers for lifting and propelling the ship, these propellers being each preferably formed with a hub 79 and oppositely-disposed inclined vanes 80. The propellers are clamped between roller-bearings 81 in the extensions 59 and 60 and plates 82, by nuts 83 screwed on the outer ends of the shafts 69 and 75, the latter passing through the hubs of the propeller members. The propellers operated by each set of engines contained in the casings 53 and 54 are arranged in parallel relation as represented in Fig. 6 and preferably with the axes of the blades set at right-angles to each other, though they may be adjusted to cause them to extend at any other angle as hereinafter described. The blades of the coöperating propeller members are arranged at the same angle to cause them to operate as a single propeller, the propellers on one side of the ship rotating in a contrary direction to those on the opposite side of the ship; in other words, all the propellers may be caused to rotate toward the ship or away from the ship as desired, this being provided for upon the installation of the propelling devices in the ship.

Each pair of shafts 55 and 55ᵃ is journaled between the pinions 56, 66 and 67 in bearings 84 in a wheel 85 (Fig. 6), which is journaled in an opening 86 in the casing side and on sleeves 87 and 88 journaled on the coöperating shaft 52, the opening 86 in the casing being preferably provided with a ring 87ᵃ, of wood or any other suitable material, having its central opening lined with metal as indicated at 89, roller-bearings 90 and 91 being confined between the outer periphery of the wheel 85 and the metal lining 89, and the inner periphery of this wheel and the sleeve 88, respectively, whereby resistance to the rotation of the wheel 85 in the side of the car is reduced to the minimum. Each of the wheels 85, one of which is provided for each set of shafts 55 and 55ᵃ, is formed with annular flanges 92 between which and removable flanges 93 on these wheels, the latter are held in position against movement through the openings in the rings 87ᵃ when the wheels are turned upon the shafts 52 supporting them, for the purpose hereinafter described.

From the foregoing description it will be understood that the car 36 carries at opposite sides beyond its shell 42 a series of propeller-devices arranged in pairs, the members of each pair being adapted to be operated simultaneously as a single propelling-device, the object of arranging the propellers in pairs on opposite sides of the non-rotary shafts 52 supporting them, being that of causing the propellers to be evenly balanced on these shafts.

In a machine of this character it is highly desirable that the propellers be capable of bodily movement for changing the angle at which they extend with relation to the car and that this operation of the propellers be under perfect control for effecting ascension of the ship, varying the angle at which it is propelled through the air either upwardly or downwardly, and for effecting reversal of the movement of the ship. The provision of the engines in the casings 53 and 54 and the propeller devices rotatable about their supporting shafts 52, permits of the changing of the angles at which the propellers extend with relation to the car, the following described means operating under the control of a single operator for thus bodily shifting any one or more of the propellers independently of the others: Located in the bottom of the car 36 and centrally thereof, are a plurality of tanks 94 (Fig. 5) connected together by a pipe 95, and adapted to be filled with air under pressure through a pipe 96 from a pair of air-pumps 97 of any suitable type and operated in any desirable manner and located at one end of the car 36. The tanks 94 are connected with an operating board 98 through the medium of pipes 99 and 100 which communicate with parallel conduits 101 (Figs. 11 and 17) in the board, these conduits opening into two pairs of cross-conduits 102 and 103 located in the opposite end-portions of the board, whereby air under pressure admitted into the pipes 100 by opening a valve 104 (Fig. 5) in the pipe 99 fills the conduits 101, 102 and 103 which are preferably disposed horizontally as shown. Each of the conduits 103 opens into a plurality of valve-housings 105 spaced apart and disposed at right-angles to these conduits, the conduits 102 opening into similar, but smaller, valve-housings 106, arranged in a series parallel with the housings 105 and opposing the latter, as represented in Fig. 11, the number of the sets of housings, each comprising a housing 105 and 106, corresponding to the number of propeller-devices. In the construction illustrated, six propeller-devices and six sets of housings are provided. Each of the valve-housings 105 is connected with its opposite companion housing 106 by upper and lower conduits 107 and 108, respectively, (Figs. 14 and 23), and each housing 105 communicates with upper and lower conduits 109 and 110 connecting with pipes 111 and 112, respectively, each set of the pipes thus provided opening into a compressed air engine 113 of any suitable type, the rotary member of which is adapted to be operated in either direction by changing the direction of the flow of compressed air through it, one of such motors being provided for each of the propeller mechanisms illustrated in Fig. 6. These motors are preferably supported on the false-flooring 114 of the car 36 at points adjacent to the propeller mechanisms with which they coöperate. The drive-shaft 115 of each motor carries a sprocket 116 connected by a sprocket-chain 117 with a sprocket 118 fixed on a rotatable shaft 119 journaled in spaced bearings 120 (Fig. 8) adjustably secured to the inside of the car 36, the shafts 119 carrying worms 121 which mesh with worm-wheels 122 rigid on the rotatable rings 85, whereby operation of the air-motors, as hereinafter described, rotates the worms 121 and causes the rings 85, the engines in the casings 53 and 54 and the propellers operated thereby to turn about the supporting shafts 52 in either direction, depending upon the course of the compressed air through the air-motors, for varying the position of the propeller-blades with relation to the car and causing them to extend horizontally as indicated of certain ones in Fig. 3, vertically as indicated of others in this figure, or in inclined position in either direction, for the purposes hereinafter explained, each of these air-motors being capable of independent operation for changing the position of one or more of the propeller-devices independently of the others as desired. The worms 121 serve as locks, when the air-motors are not operating, for preventing the gears 122 from turning, to thus maintain the propellers in the position of adjustment to which they are moved by operating the air-motors. The operation of the rotary members of the air-motors in either direction is under the complete control of the operator who is positioned at the board 98, through the medium of valve-devices located in the latter, and of which the following is a description: Each of the valve-housings 105 contains a rotatable and longitudinally reciprocable valve 123 (Fig. 14) formed with a peripherally reduced central portion affording an annular channel 124 between heads 125 and 126 circular in cross-section and having a sliding fit in the respective housing 105; two transverse parallel ports 127 and 128 spaced apart and adapted to register with the conduits 107 and 109 and 108 and 110, respectively, when the valve is in one position as represented in Fig. 14, and cross-ports 129 and 130, the port 129 being adapted to be moved into registration with the conduits 107 and 110 and the port 130 with the conduits 108 and 109, respectively, when the valve is rotated from the position illustrated in Fig. 14 to that represented in Fig. 15, the arrangement of the parallel ports 127 and 128 and the cross-ports 129 and 130 being clearly illustrated in Figs. 23 to 26 inclusive. The valves 123 are adapted to be manually operated each independently of the other by means of rotatable slide-rods 131, one for each valve 123, these rods being journaled between their ends, beneath the board 98 near its opposite ends, and in parallel superposed condition, as represented in Figs. 12 and 13, in depending bracket-members 132, and at their extremities they carry hand-levers 133 rigid therewith through the medium of which they may be moved back and forth and simultaneously rotated. The rods 131 are connected with the valves 123 by means of toggle-levers 134 each pivoted to its supporting-rod 131, as indicated at 135 (Fig. 22) and to a depending extension 136 on its coöperating valve 123, as indicated at 137 (Fig. 15), the axes upon which each of these toggle mechanisms are pivoted to the rods 131 and extensions 136 being at right-angles to each other, as clearly represented in Fig. 22. It will thus be understood that by moving the rods longitudinally in the bracket-members 132, the valves 123 connected therewith will be turned in their housings 105, and by rotating these rods in their bearings these valves will be moved lengthwise in their housings, whereby the channels 124 in the valves 123 may be caused to register with either of the air-conduits 109 or 110 leading to the air-motors, as clearly represented in Figs. 20 and 21 respectively; or the ports 127 and 128 therein may be caused to register with the conduits 107, 109, 108 and 110, as hereinbefore described and illustrated in Fig. 14; or the cross-ports 129 and 130 may be caused to extend into operative position, as indicated in Figs. 15 and 23; or the heads 125 and 126 may be brought into registration with the conduits 109 and 110 and thus close these conduits to the passage of air from the conduits 101 to the air-motors, each valve 123 being adapted to be independently operated for the purpose above stated through the medium of its coöperating rod 131.

Each of the valve-housings 106 (Figs. 14 and 15) contains a vertically-movable valve 138 formed with heads 139 and a reduced central portion 140, these heads being so spaced that they will close the ports 107 and 108 opening into the respective housings 106 when the valves 138 are in one position. Fulcrumed, as indicated at 141 and 142, on depending brackets 143 and 144 carried by the board 98 on its under side, are pendulums 145 and 146, respectively, one of the pendulums 145 being provided for the end sets of valves 139, and one of the pendulums 146 being provided for each of the two intermediate valves 139, these pendulums being disposed at opposite sides of the median line of the car, as represented. The pendulums are provided with arms 147 and 148, respectively, which extend at right-angles to the depending portions of these pendulums, the arms 147 on the two pendulums at the rear end of the board, viz., at the right-hand side of Fig. 13, extending rearwardly, whereas the other arms 147 extend forward, these arms being pivotally connected, as indicated at 149, to depending extensions 150 on the valves 138. The arms 148 of the pendulums 146 pivoted, as described, extend transversely of the board in opposite directions of the median line of the car, as clearly indicated at Fig. 12. It will thus be understood that by so pivoting the pendulums 145 and 146, the pendulums 145 will operate the valves connected with them when the car carrying the board 98 is tilted longitudinally in either direction, and the pendulums 146 will operate the valves they control when the car is tilted laterally in either direction, for the purposes hereinafter referred to.

The operation of the described construction is as follows: The car 36, to which the described upper-structure is rigidly secured for maintaining the latter at the desired distance above the car, may normally rest on wheels 151 on the ground. Preparatory to operating the car for raising it, the air-pumps 97 are started to pump air into the tanks 94, whereupon the operator of the ship located at the controlling-board 98, which latter, for convenience in describing the operation of the device, will be considered at the rear end thereof, rotates the rods 131 at the opposite sides of the board, to cause the valves 123 to move in their housings 125 to the position illustrated of the one in Fig. 20 and open the conduits 103, filled with compressed air, to the conduits 109 extending to each air-motor 113, through the medium of the channels 124 in these valves, thus permitting air under pressure to flow to the air-motors, the latter in operating causing the propeller-members of all of the propellers to be swung bodily about their supporting shafts 52 to a position in which they extend at more or less of an angle to the horizontal from front to rear of the car, the air-motors operating in a direction to cause the propelling mechanism to revolve about their supporting shafts to the right in Fig. 1. As soon as the propellers have been turned about their shafts 52 to the desired position of adjustment, the operator may, by sliding the rods 131 in the bracket-members 132 and simultaneously rotating them therein, cause the solid portions of the heads 125 and 126 to register with the conduits 109 and 110 and thus shut off the flow of air to the air-motors, the worms 121 operated by these motors serving by their engagement with the gears 122 to lock the propelling mechanisms in adjusted position about their supporting shafts 52. With the propellers thus positioned relative to the car 36, the engines contained in the casings 54 and which, as hereinbefore stated, may be of the internal combustion type supplied with the explosive mixture from carbureters 152, fed with oil from tanks 153 in the car, are started into operation to rotate the propeller blades through the medium of the shafts 55 and 55ᵃ, the propeller devices on one side of the car operating in a direction opposite to that in which the propellers on the opposite side of the car operate, as hereinbefore described. The ship, under the action of the propellers in beating against the air beneath them, will roll along on its wheels on the ground and then start to rise, taking a course at an angle to the horizontal plane. When the propellers are set to cause them in their action to lift the machine and drive it forward, the front inclined portion 41 of the plane operates to move against the air at an angle to the horizontal and thus the action of the propellers in performing the lifting function is supplemented by the action of this plane, and the speed at which the machine travels upward is thereby augmented. Upon reaching the height desired, the operator, to cause the machine to travel forwardly, again turns the rods 131 in the members 132 to cause the channels 124 in the valves 123 to communicate with the conduits 110 for operating the air-motors to cause the propellers to incline at the desired angle from front to rear. Thereupon, by rotating the rods 131 in the direction opposite to that just referred to, the valves 123 will be raised and the solid portions of the heads 125 and 126 will be caused to close both conduits 109 and 110, thus permitting the worms 101 to lock the propellers in adjusted position about their supporting shafts 52.

If descent of the ship is desired, it may be accomplished by either slowing down the speed of the propellers or by again rotating the rods 131 to cause the channels 124 in the valves 123 to register with the conduits 110, thus permitting air to pass into the air-motors in the direction above referred to, and turning the propellers about their supporting shafts 52 from the driving position to the left in Fig. 1, until they incline upwardly from front to rear, whereupon the operator may, by moving the rods 131, shut off the supply of air to the air-motors, in which position the propellers will remain until the air-motors are again operated. If it is desired to raise the ship to a higher level, instead of depressing it, or after lowering it as described, the operator, by rotating the rods 131 in the opposite direction, will cause the channels 124 to register with the upper conduits 109, thus permitting air under pressure to flow into the air-motors in the direction opposite to that above referred to, with the result of turning the propellers to the right in Fig. 1 to the desired position of adjustment about their supporting shafts 52, in which position they may be held as hereinbefore described.

The foregoing operation describes the machine as controlled manually by the operator by adjusting all of the propellers; but it will be understood that, as hereinafter fully explained, the rise and descent and propulsion of the machine may be effected by operating certain ones only of the propeller mechanisms.

As is well known, an air-ship in traveling through the air is subject to air-currents, which, especially when flowing intermittently and producing gusts of wind, tend to tilt the ship and throw it out of its course, and unless this action is counteracted it may cause the machine to upset. Furthermore, the shifting of objects in the car tends to throw the latter out of balance with the results above stated. To counteract the injurious effects produced by the currents of air and the shifting of objects in the car and thus maintain the car in balanced condition while traveling through the air, I provide the pendulum-operated valve mechanisms hereinbefore described, the pendulums 145 and 146 thereof, by being supported on opposite sides of the car to swing longitudinally and transversely with relation to the latter, always hanging vertically, and thus when the car is tilted either longitudinally or laterally, they will operate the valves for righting the car and maintaining it in true balance in the following manner: As soon as the ship has attained flight, as hereinbefore described, the operator may, in order to render the automatic operation of the valve-means effective, actuate all of the rods 131 to move the valves 123 in their housings to the position illustrated of those in Fig. 14, to cause the parallel ports 127 and 128 in these valves to register with the coöperating conduits 107, 109, 108 and 110, as therein illustrated, and thus provide direct communications from the housings 106 to the conduits 109 and 110. The valves 138 when in their normal condition, namely, when the ship occupies a horizontal plane while either traveling parallel with the earth-surface or through a path inclined in either direction thereto, are caused by the pendulums 145 and 146 to close the conduits 107 and 108 to the housings 106. Should the ship, in traveling horizontally in a path paralleling the earth-surface or at an angle thereto, encounter air-currents to tilt the ship longitudinally, or should objects be moved in the car tending to throw it out of balance longitudinally, those of the valves 138 controlled by the pendulums 145 will be caused to move in their housings 106, as the pendulums always hang vertically. Thus, should the ship tilt upwardly at its forward end while traveling through the air, the end set of valves 138 at the forward end of the board will be drawn down in their housings to cause the lower conduits 108 and 110 to be open to the channels 140 in these valves and thus to the pipes 112, and the end set of valves 138 at the rear end of the board 98 will be raised in their housings to cause the upper conduits 107 and 109 coöperating therewith to register with the channels 140 in these valves, whereby the air-motors for actuating the front set of propellers at both sides of the car will be driven to cause these propellers and their operating engines to be turned about their coöperating shafts 52 supporting them to the left in Fig. 1, and the rear sets of propellers to be rotated to the right in Fig. 1. Thus operating the end sets of propellers will cause the front set thereof during their movement to the left in Fig. 1 to exert a pull downwardly and the rear sets of propellers to produce a push upwardly, with the result of causing the ship to swing to horizontal position. The valves thus operated automatically remain in this condition until the ship has righted itself, whereupon these valves return, through the action of their coöperating pendulums, to the normal position illustrated in Fig. 14, the ship continuing to travel in a horizontal direction until again tilted by air-currents or shifting of objects in the car, whereupon the end sets of valves 138 will again be operated for righting the car, as described. Should the machine be tilted downwardly at its front end, the end sets of valves 138 will be again operated, but in the opposite directions to that described, the air for operating the motors for the rear sets of propellers for changing the angle at which the latter extend to the car being permitted to enter their coöperating conduits 108 and 110 and flow to the motors controlling these propellers, and the air for operating the motors for changing the angle at which the front sets of propellers extend entering the conduits 107 and 109 coöperating with the front set of valves 138, with the effect of causing the rear sets of propellers and their propelling engines to move bodily about their supporting shafts 52 to the left in Fig. 1, and the front set of propellers and their propelling mechanism to turn on their supporting shafts 52 to the right in Fig. 1, which will cause the propellers at the front of the ship to exert a greater lifting force than those at the rear end thereof, and thus the ship will be righted. As the car assumes a horizontal position, the pendulums 145 operate to move the valves to close the conduits 107 and 108 for stopping the operation of the air-motors. It will thus be seen that the tilting of the ship longitudinally in either direction automatically operates the pendulum-controlled valves 138 for returning the ship to balanced condition. Should the ship while in the air tilt laterally, such tilting will produce actuation of the intermediate sets of valves through the medium of the pendulums 146, to cause air to flow to the motors for rotating the intermediate propeller mechanisms about their coöperating shafts 52 to change the angles at which these propellers incline to the car for reducing the lifting power of the propeller at the side being tilted upward, and augment the lifting power at the side being depressed by causing the compressed air to actuate these motors in different directions as described of the end sets of motor-controlling mechanisms. Thus, should the ship be tilted downwardly at the right side thereof when viewed from the front end of the machine, the intermediate valves 138 will be moved upwardly and downwardly respectively to cause the channel in the valve on the right-hand side of the machine to open into its co-operating conduits 107 and 109, and the channel 140 on the other of the intermediate valves 138 to communicate with the conduits 108 and 110, with the result of causing the intermediate propeller on the right-hand side of the ship to be turned to the right in Fig. 1, and the intermediate propeller on the other side of the ship to be turned to the left in this figure, whereby augmenting of the lifting force on the right-hand side of the ship and decrease of this force on the left-hand side to cause the ship to be righted, are effected. Tilting of the ship laterally in the opposite direction will produce movements of the intermediate valves 138 contrary to that just described for effecting the righting of the ship, as is manifest.

From the foregoing description it will be readily understood that tilting of the ship either longitudinally or laterally in either direction produces instantaneous operation of the valves 138 connected with the pendulums thus brought into operation, the respective valves 138 being maintained open only so long as is necessary to produce the turning of the propellers about their coöperating shafts 52 to a position in which the lifting power will be adequate to right the ship, the effect of the particular relative positions of the propellers thus affording cross-balancing of the car. The provision of automatically operating means for the purpose above stated overcomes the disadvantages of manually-controlled mechanism for this purpose and serves to obviate one of the most serious objections to air-ships as hitherto constructed.

The pendulum-operated mechanism is not only useful in maintaining the ship in upright position when all of the propellers have been preparatorily set by the operator for propelling the machine in a horizontal plane, or in an inclined plane, but may be operated to advantage for maintaining the ship in upright position when the operator, by manipulating the manually-controlled valves for the sets of propellers at either end, causes the ship to move through an inclined path either upwardly or downwardly. Thus, when it is desired that the ship ascend to a higher level, assuming that the propellers extend vertically as illustrated in Fig. 1, the operator, by rotating the rods 131 connected with the valves 123 controlling the forward set of propellers, will cause these valves to be lowered in their housings to carry the channels 134 therein into registration with the coöperating conduits 110, thus operating the forward set of air-motors and causing their coöperating propellers and operating engines to turn about the coöperating shafts 52 to the right in Fig. 1, whereby the lifting action of these propellers is augmented. As soon as these propellers have turned to the angle desired, the operator may rotate the rods 131 thus operated to cause the heads of the valves 123 to close their coöperating conduits 109 and 110 to prevent the automatic operation of the forward sets of valves 138. By thus positioning the front set of propellers, the ship will tilt rearwardly, thus causing the rear set of pendulums 145 to raise their coöperating valves 138 and thereby permit air under pressure to enter the air-motors controlling the rear set of propellers, with the result of causing the propellers last referred to to move to the right in Fig. 1 as such an angle as will cause them to exert a lifting force sufficient to overcome any rearward tilting of the ship (the propellers in this position causing the ship to be driven forward at an angle away from the earth), but be maintained in this movement in upright position. Any force tending to tilt the ship while thus traveling at an angle will be overcome by the shifting of the propellers under the action of the pendulum mechanism.

It will be understood that the operator may, if desired, effect the balancing of the ship through the medium of the manually-controlled valves 123, but as such action is dependent entirely upon the operator and is not automatic, I prefer that the balancing be effected by the automatic means referred to, by which the ship is maintained in substantially horizontal position, regardless of the angle at which it is caused to travel toward or away from the earth under the manually-controlled valves 123 operating the air-motors for the front and rear propellers.

Turning the ship to the right or left may be effected by operating rudders 154 as through the medium of the cables 155 and 156 wound upon windlasses 157 located adjacent to the operating board 98, or by manually operating the valves 128 through the medium of their respective rods 131 on the side of the ship opposite to the direction in which it is desired to turn, to cause these propellers, assuming them to be in vertical position, to turn upon their shafts to the right or left in Fig. 1 to cause their propelling power to be reduced, as compared to those on the opposite side. If the ship is to be turned abruptly, the propellers on the side corresponding to the direction in which the ship is to be turned may be turned to horizontal position by operating the rods controlling the valves 123 therefor, and the propellers on the other side of the ship be caused to assume a vertical position.

The ship illustrated is capable of propulsion in either direction. Thus, if it is desired to arrest the ship's movement in the forward direction for stopping it, or reversing its course, the operator, assuming the propellers to be inclined upwardly from front to rear for driving the ship forwardly and upwardly, will rotate all of the rods 131 to cause the valves 123 to register at their channels 124 with either of the conduits 109 or 110, and thus permit the air-motors to turn the propellers and their coöperating engines bodily about their coöperating shafts 52 through the horizontal plane, or into upwardly inclined position from the rear to the front of the ship, the propellers, when the course is reversed, operating to drive the ship rearwardly. It is manifest that the direction in which these propellers are turned about their supporting shafts produces either slight lowering or raising of the ship as the propellers swing through the horizontal plane, depending upon which direction they are turned, and thus if the ship at the time of such reversal is in tilted condition, it is desirable to turn the end sets of propellers in directions which will cause the lifting action produced by the propellers to be exerted at the lowered end of the ship. If continued travel in the rearward direction under the action of the automatic mechanism referred to is desired, the valves 123 should be operated through the medium of the rods 131 to cause them to occupy a position in which their cross-ports 129 and 130 will register with the conduits 107 and 110, and 108 and 109, respectively, the valves 123 thus positioned causing the pendulum-operated valves 138 to operate the air-motors controlling the various sets of propellers for effecting balance of the ship in a manner hereinbefore explained, the provision of the cross-ports 129 and 130 being of importance when the ship is being driven rearwardly, in view of the fact that the air-motors for turning the propellers about their supporting shafts 52 must be operated reversely of the operation described when the propellers are driving the machine forward. As the car 36 and plane 37 of the ship are each of the same shape at both ends, the aeroplane action of the rear inclined portion 41 is the same as that described of the front inclined portion 41.

Under certain conditions attending the operation of the ship, it may be desired to so drive it as to cause the pendulums, unless restrained in their operation, to open the air-conduits in the board communicating with the housings 106 to the atmosphere and thus permit of the loss of air-pressure. To avoid the action above referred to, I provide on the upper side of the board adjacent to the upper end of each valve 138, a device for permitting these valves to be releasably locked in normal position independently of each other, these devices each comprising a pair of standards 250 supporting a cross-member 251, by threaded lugs 252 thereon. The member 251 contains an opening 253 registering with and slightly larger than the upper ball-shaped end of its coöperating valve 138, and recesses 254 extending longitudinally of the plate on opposite sides of the opening 253 and of less width than the latter. The ends of the lugs 252 are threaded and carry nuts 255 operating against the outer sides of the standards 250, whereby by shifting the members 251 transversely of their coöperating valves 138 when the latter are in normal position, as by tightening one of each pair of nuts 255 and loosening the others, the marginal walls of the openings 253 may enter peripheral slots 256 in the upper ends of the valves 138, it being understood that the members 251 are independently operative for locking their respective valves 138.

As my invention is applicable not only to ships of the aeroplane type, but to those of the type employing gas-bags, I have illustrated it in Figs. 27 to 31, inclusive, in a construction adapted to be provided with a gas-reservoir, the latter serving to augment the lifting power of the propeller where such increase in the lifting power is desired. In this construction, the framework upon which the canvas 40 is supported for forming the plane 37 is provided between its innermost parallel frame-members 158, which are flanged on their inner surfaces as indicated at 159, with removable frame-sections 160, the end-sections being pointed, as represented in Fig. 27, to conform to the outline of curved brace-rods 161 secured to the frame-members 158, these removable sections being covered with canvas, or any other suitable material, as described of the main portion of the plane, and being removably held in place on the flanges 159, and on similar flanges on the brace-rods 161, by pins 162 and rods 163 passing through the brace-rods, side-members 158 and the frame-work of the sections 160. When the removable sections 160 are secured to the frame-work of the plane as described, the canvas-covering of the plane is rendered continuous and presents a plane operating with the same effects as that described of the plane illustrated in the preceding figures. The provision of the sections 160 permits of the removal of any one or more of them and the substitution therefor of a gas-bag or bags, either formed as a single bag or in sections, as illustrated at 164 in Fig. 30, these gas-bags being secured in position in the plane in any desirable manner, the gas-bags substituted for the end ones of the sections 160 being pointed at their ends as represented in Fig. 30. It will thus be seen that a gas-bag formed integrally and filling one or more of the openings presented by the plane by removing the sections 160 thereof, or formed of separate sections as illustrated in Fig. 30, may be fixed in position on the plane to aid in lifting the ship.

By forming the gas-bag with pointed ends, it enables the ship to be driven in either direction with the minimum resistance.

It has been found desirable in practice to provide the plane with an opening through it intermediate its ends, especially when the structure is used in stormy weather, the provision of such an opening serving as a vent for the air and steadying the ship. Thus under some conditions it may be found desirable to operate the plane with the sections 160 removed. The size of the opening, which will of necessity vary with relation to the size of the ship, may be, in a case where the plane is 150 feet long and 60 wide, about 40 feet long and about 6 feet wide, or approximately 240 square feet, more or less.

If desired, the engines for rotating the propellers, instead of being so connected therewith as to turn with them about their coöperating shafts 52, when operated by the air-motors as described, may be connected with the propellers in a manner to remain stationary at all times, but permit of the turning of the propellers upon their shafts 52 for varying the angle at which they extend to the ship, two ways of accomplishing this result being represented in Figs. 32 to 35, inclusive. In Figs. 32 and 33 the engines which are contained in the casings 165 and oppose each other are supported on standards 166 which, in practice, will rest upon the floor 114 of the car to cause the engines to occupy positions above the floor corresponding to the positions occupied by the engines in the casings 54 of the construction shown in the preceding figures. The crank-shafts 167 of the engines of each set carry pinions 168 which mesh with the gear 169 supported in the adjacent side of the car 37, this gear meshing with diametrically opposed pinions 170 fixed on the propeller shafts 171. The shafts 171 are journaled in a sprocket-wheel 172 which is journaled in the side of the car 37, this sprocket-wheel being adapted to be rotated by an air-motor, as described of the construction shown in the preceding figures, the pinions 170 rolling around the gear 169 in either direction when the sprocket 172 is rotated, depending upon the direction in which the air-motors are driven. It will thus be understood that the propellers carried on the ends of the shafts 171 may be caused to be turned about their supporting rods 52 for the purposes described of those illustrated in the preceding figures. In Figs. 34 and 35 the engines which are mounted in the casings 173 are supported directly on the floor 114 of the car, the crank-shafts 174 and 175 of these engines carrying sprocket-wheels 176 and 177 connected respectively by chains 178 and 179 to sprockets 180 and 181 rigid with a gear 182 and rotatable about a supporting shaft 52, the gear 182 corresponding with the gear 169 of Fig. 32 and meshing with pinions 183 and 184 on propeller-shafts 185 and 186, respectively, the latter being journaled in a slotted sprocket-wheel 187, like the wheel 172 in the last referred to figure, whereby by turning the sprocket-wheel 182 from the air-motors with which it is connected the angle at which the propellers connected therewith extend with relation to the car may be varied at will, or by the operation of the automatic means hereinbefore referred to.

One of the important features of my invention is the accurate balancing of all parts of the ship, it being apparent from the foregoing description and drawings that the car is swung centrally of the plane above it, the engines are located on opposite sides of the car at equal distances from the median line of the latter, and in the preferred construction illustrated are disposed on opposite sides of their supporting shafts, as is true of the propellers, to render the turning of these parts about their supporting shafts 52 as free as possible.

It will be manifest from the foregoing description that where conditions render it advisable, the number of propellers used may be increased or diminished to provide the desired lifting and propelling power, and in case more propellers are used than are illustrated in the drawings, each propeller so added may be connected with an air-motor or other suitable operative device and the controlling board 98 be equipped with a hand-operated valve and an automatically-operated valve for each added motor, the addition of more propellers than those illustrated merely involving amplification of the operating mechanism described for each added propeller.

While I have described the engines for rotating the propellers as of the explosion type and the pendulums as controlling the operation of air-motors, I do not wish to be understood as limiting my invention in these particulars to such power means, as any other suitable form of engine or motor may be employed, and any other suitable mechanism may be substituted for the mechanism controlled by the pendulums for effecting the results described, the feature of my invention, as regards the pendulums, being that of automatically operating the propellers to cause them to turn about their supports for changing the angle at which they extend with relation to the car for maintaining the ship in balance.

By forming the car as hereinbefore described, it not only affords the minimum resistance to the air while traveling through the latter, but permits of the operation of the car in the water should such be desired, the parts of the car being so proportioned as to cause it to draw relatively few inches of water when resting thereon, and thus the force exerted by the propellers (which in thus operating the ship would be preferably positioned on their supporting shafts 52 to cause them to incline, and thus not only tend to push upward in the car, but in a direction for propelling the car through the water) would drive the latter in either direction through the water, depending upon whether the propellers incline upwardly or downwardly from front to rear. When the car is thus operated, the pendulums 145 and 146 will serve, as in the manner hereinbefore described, for maintaining the ship in horizontal position.

The functions of the propellers may be attained by setting them in any of various relative positions other than those specifically shown and described, provided that at least two of them occupy positions at relatively opposite sides of the longitudinal center of the ship, for lateral balancing, and one at or near an end of the car for longitudinal balancing, so that I do not intend to limit my invention with regard to the propellers to any particular relative positions thereof further than as thus indicated.

It is to be noted that the feature of having the plane extend over the entire structure is of importance, for by so disposing the plane it serves the function of a parachute and operates as safety means in case the propelling machine becomes disabled. It is furthermore to be noted that by the construction shown and described, the heavy parts of the structure are all embodied with the depending car, which being centrally located, brings the center of gravity of the structure into the most advantageous position; and it will also be observed that the elements of the structure are so relatively disposed about the center of the car as to tend to balance the latter.

The expression "superstructure" employed in the claims refers to the structure of the ship above the car, whether such structure be in the form of an aeroplane, a gas-bag, or a combination of both.

While I have devised my improvements for use more particularly in connection with a superstructure in the form of a plane, gas-bag, or the like, they may be used to advantage, and within my invention, in an air-ship in which no superstructure is provided.

What I claim as new and desire to secure by Letters Patent is—

1. In an air-ship, the combination of its superstructure, a car connected with and depending from said superstructure, a frame surrounding the car and extending in the same horizontal plane as the latter and formed of side and end members connected together and spaced from the car, cross-members connected with said side members and extending through said car, and curved members connected with said side, end and cross-members and forming circular openings in the frame at opposite sides of the said car, propellers supported on said cross-members in said openings and adapted to be turned about said cross-members for setting the propellers, and means for driving said propellers.

2. In an air-ship, the combination of a support carried by the ship, a propeller-device formed of two spaced members provided with blades carried by said support and diametrically opposed thereon, means for rotating said propeller-members disposed on opposite sides of said support and movable with said propellers about said support whereby the propeller members and driving means therefor are in balanced condition about said support, and means for moving said propellers and operating means therefor about said support, for the purpose set forth.

3. In an air-ship, the combination of a rotatably supported propeller, means for rotating said propeller, a motor for turning said propeller on its support to set it, a source of fluid-pressure supply, and a combined rotary and slide valve interposed between said motor and supply, for the purpose set forth.

4. In an air-ship, the combination of a rotatably supported propeller, means for rotating said propeller, a motor for turning said propeller on its support to set it, a source of fluid-pressure supply, a pair of valves, one of which is a combined rotary and slide valve, interposed between said motor and supply, and automatically-operated means actuated upon tilting of the ship for operating the other of said valves, for the purpose set forth.

5. In an air-ship, the combination of a plane, a car depending therefrom and extending centrally of the plane, propellers supported on the car at opposite sides thereof below the plane and adjacent to the lateral edges and ends thereof, said propellers being adapted to be turned on their supports to set them, means for rotating said propellers, and means operating automatically upon tilting of the ship for turning the propellers on their supports to right the ship.

6. In an air-ship, the combination of a plane provided with an upwardly-inclined section at one end thereof, a car depending therefrom and extending centrally of the plane, propellers supported on the car at opposite sides thereof below the plane, and adjacent to the lateral edges and ends thereof, said propellers being adapted to be turned on their supports to set them, means for rotating said propellers, and means operating automatically upon tilting of the ship for turning the propellers on their supports to right the ship.

7. In an air-ship, the combination of a plane provided at its opposite ends with upwardly-inclined sections, a car depending therefrom and extending centrally of the plane, propellers supported on the car at opposite sides thereof below the plane, and adjacent to the lateral edges and ends thereof, said propellers being adapted to be turned on their supports to set them, means for rotating said propellers, and means operating automatically upon tilting of the ship for turning them on their supports to right the ship.

8. In an air-ship, the combination of a car, a support on the ship, and a propeller formed of two spaced members provided with blades, and power-devices for driving said propeller-members rotatably mounted on said support to permit said propeller-members and driving means to be turned together upon said support for setting the propeller relative to the car, said power-devices and said propeller-means being disposed on opposite sides of said support.

9. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, separate valves for controlling the flow of said pressure to the motors, and means operated automatically upon tilting of the car to move said valves for controlling the flow of fluid-pressure to said motors, for the purpose set forth.

10. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, separate valves for controlling the flow of pressure to the motors, and pendulum-actuated means operated upon tilting of the car to move said valves for controlling the flow of fluid-pressure to said motors, for the purpose set forth.

11. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, separate valves for controlling the flow of said pressure to the motors, and pendulums pivotally suspended on the car and operatively connected with said valves for actuating the latter to direct fluid-pressure to said motors, for the purpose set forth.

12. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, separate valves for controlling the flow of said pressure to the motors, and pendulums connected with said valves and constructed and arranged to operate the latter in opposite directions for controlling the flow of fluid pressure to said motors, for the purpose set forth.

13. In an air-ship, the combination of a car, a set of propellers supported on the ship and adapted to be turned on their supports for setting them relative to the car, means for driving the propellers, means operated automatically upon tilting of the car for turning the propellers to set them, and manually-controlled means for moving the propellers independently of each other and of said automatic means on their supports to set them, for the purpose set forth.

14. In an air-ship, the combination of a car, a set of propellers supported on the ship and adapted to be turned on their supports for setting them relative to the car, means for driving the propellers, pendulum-actuated means operated automatically upon tilting of the car to set the propellers for righting the ship, manually-controlled means for moving the propellers independently of each other and of said pendulum-means on their supports for changing their positions with relation to the car, for the purpose set forth.

15. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, separate valves for controlling the flow of said pressure to the motors, manually-controlled means for operating said valves, and means operated automatically upon tilting of the car for operating said valves to set the propellers, for the purpose set forth.

16. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, separate valves for controlling the flow of said pressure to the motors, manually-controlled means for operating said valves, and pendulum-actuated means operated upon tilting of the car for actuating said valves to set the propellers, for the purpose set forth.

17. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, a set of coöperating valves for each motor for controlling the supply of fluid-pressure thereto, manually-controlled means for operating a valve of each set, and means operated automatically upon tilting of the car to actuate the other valves of said set, for the purpose set forth.

18. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, a set of coöperating valves for each motor for controlling the supply of fluid-pressure thereto, a slide-rod connected with one of the valves of the sets for operating the latter, and automatic means for actuating the other of said valves upon tilting of the car, for the purpose set forth.

19. In an air-ship, the combination of a car, a plurality of propellers supported on the ship and adapted to be turned on their supports for setting them relative to the car, means for driving the propellers, and automatically-operated means constructed and arranged to be actuated upon tilting of the car longitudinally or laterally for moving the propellers on their respective supports to right the car.

20. In an air-ship, the combination of a car, a plurality of propellers supported on the ship and adapted to be turned on their supports for setting them relative to the car, means for driving the propellers, and pendulum-operated means constructed and arranged to be actuated upon tilting of the car longitudinally or laterally for moving the propellers on their respective supports to right the car.

21. In an air-ship, the combination of a car, a plurality of propellers supported on the ship and adapted to be turned on their supports for setting them relative to the car, means for driving the propellers, and automatically operated means constructed and arranged to be actuated upon tilting of the car for setting certain of the propellers when the ship tilts laterally and setting others of the propellers when the ship tilts longitudinally.

22. In an air-ship, the combination of a car, a plurality of propellers supported on the ship and adapted to be turned on their supports for setting them relative to the car, means for driving the propellers, and pendulum-operated means constructed and arranged to be actuated upon tilting of the car for causing certain of the motors to operate for turning certain of the propellers on their supports to set them when the ship tilts laterally and others of the said motors to operate for turning others of the propellers on their supports to set them when the ship tilts longitudinally.

23. In an air-ship, the combination of a car, propellers supported on the ship at opposite sides of the car and adapted to be turned on their respective supports, automatically-operated means for moving the end propellers in opposite directions when the car tilts longitudinally, and automatically-operated means for moving the intermediate propellers on their supports when the car tilts laterally, for the purpose set forth.

24. In an air-ship, the combination of a car, a support carried by the ship, a propeller-device formed of two spaced members provided with blades carried by said support and diametrically opposed thereon, means for rotating said propeller-members disposed on opposite sides of said support and movable with said propellers about said support, and means for moving said propellers and operating means therefor about said support, for the purpose set forth.

25. In an air-ship, the combination of a car, a propeller-device formed of two spaced members provided with blades, a pair of motors for driving said propeller, said propeller-device and driving means being rotatably supported on the ship in balanced condition, and gear-mechanism connecting said motors together.

26. In an air-ship, the combination of a car, a support carried by the ship, a propeller-device formed of two spaced members provided with blades carried by said support and diametrically opposed thereon, engines for rotating said propeller-members disposed on opposite sides of said support and movable with said propellers about said support, a motor for moving the propellers and engines simultaneously on said support, and means operated automatically by tilting of the car to actuate the motor for moving said propellers and engines on their supports in either direction, for the purpose set forth.

27. In an air-ship, the combination of a car, an operating board on said car containing a conduit, a source of fluid-pressure supply leading to said conduit, valve-housings in said board communicating with said conduit, valves in said housings, propellers carried by the ship and supported to be rotated and moved about their supports to change their positions relative to the car, fluid-pressure motors for turning said propellers about their supports communicating with said conduits and valves, and means for moving said valves in their housings for controlling the supply of fluid-pressure to the motors, for the purpose set forth.

28. In an air-ship, the combination of a car, a shaft carried by said car, a ring rotatable on said shaft, a propeller-device formed of two spaced blade-equipped members disposed on opposite sides of the shaft and movable about the latter, rotary shafts journaled in said ring and operatively connected with said propeller-members, a pair of engines rotatably mounted on said supporting shaft and operating to drive said rotary shafts, and means for turning said ring, engines and propeller-members about said first-named shaft, for the purpose set forth.

29. In an air-ship, the combination of a car, propellers carried by the ship and adapted to be turned on their supports for setting them relative to the car, means for driving said propellers, manually-controlled means for controlling the turning of the propellers on their supports, and means operated automatically upon tilting of the car for setting the propellers, said manually-controlled means and said automatically-operated means being controllable independently of each other from a central station on the car.

30. In an air-ship, the combination of a car, propellers carried by the ship and adapted to be turned on their supports for setting them relative to the car, means for driving said propellers, manually-controlled means for turning the propellers on their supports to set them, and pendulum-operated means operated automatically upon tilting of the car for setting the propellers, said manually-controlled means and said automatically-operated means being controllable independently of each other from a central station on the car.

31. In an air-ship, the combination of a car, propellers carried by the ship and adapted to be turned on their supports for setting them relative to the car, means for driving said propellers, means operated automatically upon tilting of the car for setting the propellers, and manually-controlled means, independent in their operation of said automatic means, for setting the propellers, said manually-controlled means and said automatic means being controllable from a central station on the car.

32. In an air-ship, the combination of a car, propellers carried by the ship and adapted to be turned on their supports for setting them relative to the car, means for driving said propellers, a source of fluid-pressure, fluid-pressure motors for turning the propellers to set them, and manually-controlled valves and automatically-operated valves, the latter actuated upon tilting of the ship, for controlling the passage of the fluid-pressure to the motors, said valves being located at a central station on the car, for the purpose set forth.

33. In an air-ship, the combination of a car, propellers carried by said ship and adapted to be turned on their supports for setting them relative to the car, means for driving said propellers, separate motors for turning the propellers to set them, and means, located at a central station on the car, for controlling the motors independently of each other, for the purpose set forth.

34. In an air-ship, the combination of a car, propellers carried by said ship and adapted to be turned on their supports for setting them relative to the car, means for driving said propellers, separate motors for turning the propellers to set them, manually-controlled means and automatically-operated means for controlling the motors independently of each other, said manually-controlled means and said automatic means being operative independently of each other, and both controllable from a central station on the car.

35. In an air-ship, the combination of a car, a propeller supported on the ship and adapted to be turned on its support to set it for driving the ship in either direction, means for rotating the propeller, and means operated automatically upon tilting of the ship in traveling both forward and backward for setting the propeller to right the ship.

36. In an air-ship, the combination of a car, a propeller supported on the ship and adapted to be turned on its support to set it for driving the ship in either direction, means for rotating the propeller, and pendulum-operated mechanism actuated upon tilting of the ship in traveling both forward and backward for setting the propeller to right the ship.

37. In an air-ship, the combination of a car, propellers supported at opposite sides of the ship and adapted to be turned on their supports to set them for driving the ship in either direction, means for rotating the propellers, and means operated automatically upon tilting of the ship in traveling both forward and backward for setting the propellers to right the ship.

38. In an air-ship, the combination of a car, propellers supported at opposite sides of the car and adapted to be turned on their supports to set them for driving the ship in either direction, means for rotating the propellers, and pendulum-operated means actuated upon tilting of the ship in traveling both forward and backward for setting the propellers to right the ship.

39. In an air-ship, the combination of a car, a propeller supported on the ship and adapted to be turned on its support to set it for driving the ship in either direction, means for rotating the propeller, a fluid-pressure motor for turning the propeller on its support, and means operated automatically upon tilting of the ship in traveling both forward and backward for setting the propeller to right the ship.

40. In an air-ship, the combination of a car, a propeller supported on the ship and adapted to be turned on its support to set it, and means operated automatically upon tilting of the car for turning the propeller on its support for righting the car, said means being constructed and arranged to permit the propeller to be turned at any angle with relation to the car without affecting the positioning of said automatic means.

41. In an air-ship, the combination of a car, a propeller on the ship adapted to be turned on its support to set it, and pendulum-means operated automatically upon tilting of the car for turning the propeller upon its support for righting the car, said means being constructed and arranged to permit the propeller to be turned at any angle with relation to the car without affecting the positioning of said automatic means.

42. In an air-ship, the combination of a car, a propeller supported on the ship and adapted to be turned on its support to set it, a motor operatively connected with said propeller for turning it on its support to set it, and means operated automatically upon tilting of the car for controlling the operation of the motor, said means being constructed and arranged to permit the propeller to be turned at any angle with relation to the car without affecting the positioning of said automatic means.

43. In an air-ship, the combination of a car, a propeller supported on the ship and adapted to be turned upon its support to set it, a fluid-pressure motor, valve-mechanism for controlling the supply of fluid-pressure to said motor, and means operated automatically upon the tilting of the car for actuating said valve-mechanism to supply fluid-pressure to said motor for turning the propeller to set it, said means being constructed and arranged to permit the propeller to be turned at any angle with relation to the car without affecting the positioning of said automatic means.

44. In an air-ship, the combination of a car, propellers supported on the ship at the opposite sides thereof and adapted to be turned on their supports to set them, and means operated automatically upon tilting of the car for turning said propellers upon their supports for righting the car, said means being constructed and arranged to permit the propellers to be turned at any angle with relation to the car without affecting the positioning of said automatic means.

45. In an air-ship, the combination of a car, a propeller supported on the ship and adapted to be turned on its support to set it, means for rotating said propeller, and power-means for turning the propeller on its support to set it, formed with worm-gear drive-mechanism adapted to be moved into and out of driving engagement with the propeller, to permit the propeller to be manually turned on its support.

46. In an air-ship, the combination of a car, propellers supported on the ship and adapted to be turned on their supports to set them, means for driving said propellers, fluid-pressure means for turning said propellers on their supports to set them, fluid-pressure-producing means on the car, and a controlling board on the car equipped with separate valves for controlling the flow of fluid-pressure to the respective motors.

47. In an air-ship, the combination of a car, a propeller supported on the ship and adapted to be turned on its support for setting it relative to the car, means for driving said propeller, a fluid-pressure motor for turning said propeller on its support to set it, a valve-conduit through which the motor is supplied with the operating fluid, automatically-operated means for actuating said valve upon the tilting of the car, and means for releasably locking said valve against movement, for the purpose set forth.

48. In an air-ship, the combination of a car, propellers disposed at opposite sides of the car, means for driving the propellers, means operating automatically upon tilting of the ship for setting the propellers to right the ship, and manually-controlled means operating independently of said automatic means to turn the propellers independently of each other on their supports to set them.

49. In an air-ship, the combination of a car, a propeller supported on said ship and adapted to be swung upon its support throughout a complete revolution, means for driving the propeller, and means operated automatically upon tilting of the ship to set the propeller, constructed and arranged to permit of the setting of the propeller at any angle with relation to the car without affecting said automatically-operated means.

50. In an air-ship, the combination of a car, a propeller supported on the ship and adapted to be turned on its support for setting it relative to the car, means for driving the propeller, a source of fluid-pressure supply, a fluid-pressure motor for the propeller connected with said supply for moving the propeller on its support to set it, conduits leading from the supply to the motor, valve mechanism interposed in said conduits and formed with straight ports and cross ports either of which are adapted to be moved into communication with respective conduits, and means connected with said valve mechanism for operating the latter to control the flow of fluid to said motor while the ship is traveling in either forward or backward direction, for the purpose set forth.

51. In an air-ship, the combination of a car, a propeller supported on the ship and adapted to be turned on its support for setting it relative to the car, means for driving the propeller, and automatically operated means constructed and arranged to be adjusted for operation by the ship in tilting when driven both forwardly and rearwardly.

52. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, a set of coöperating valves for each motor for controlling the supply of fluid pressure thereto, manually-operated means for operating a valve of each set, and means operated automatically by the car in tilting to actuate the other valves of said set, for the purpose set forth.

53. In an air-ship, the combination of a car, propellers supported on the ship and adapted to be turned on their supports for setting them relative to the car, fluid-pressure operating means for driving the propellers, fluid-pressure motors for setting said propellers, a compressed air-tank and an oil-tank on the ship below said propeller-driving means, said compressed air-tank communicating with said fluid-pressure motors and with said oil-tank and said oil-tank communicating with the propeller-driving means for supplying oil thereto under the action of the air introduced into the oil-tank from said air-tank.

54. In an air-ship, the combination of a car, propellers supported on the ship and adapted to be turned on their supports for setting them relative to the car, and an automatically operating power-device for each propeller constructed and arranged to be actuated upon tilting of the car for setting the propellers, said power-devices being independently operative of each other.

55. In an air-ship, the combination of a car, propellers supported on the ship and adapted to be turned on their supports for setting them relative to the car, and pendulum-operating mechanism for each propeller constructed and arranged to be actuated upon tilting of the car for setting the propellers, said pendulum-mechanisms being independently operative of each other.

56. In an air-ship, the combination of a car, propellers supported on the ship and adapted to be turned on their supports for setting them relative to the car, a fluid-pressure power-device for each propeller, and automatically operating mechanism coöperating with each of said power-devices and operating upon tilting of the car to actuate said power-devices, for setting the propellers, said automatically operating mechanisms being independently operative of each other.

57. In an air-ship, the combination of a car, propellers supported on the ship and adapted to be turned on their supports for setting them relative to the car, a motor operatively connected with each of said propellers, and automatically operating mechanism coöperating with each of said motors constructed and arranged to be actuated upon tilting of the car for setting the propellers, said automatically opening mechanisms being independently operative of each other.

58. In an air-ship, the combination of a car, propellers supported on the ship and adapted to be turned on their supports for setting them relative to the car, automatically operating power-devices for said propellers operating upon tilting of the ship either laterally or longitudinally to set the propellers for righting the ship, said power-devices being independently operative of each other.

59. In an air-ship, the combination with a plane, propellers supported on the ship at opposite ends thereof and adapted to be turned on their supports for setting them relative to the car and movable to a position in which they operate to force air from opposite directions beneath the plane, automatically-operating means operating upon tilting of the ship to set the propellers for righting the ship, said propellers being settable independently of said automatically-operating mechanism, and means for driving the propellers.

60. In an air-ship, the combination of a plane having its sides deflected downwardly, a car depending centrally from said plane thereby producing a natural balance, propellers supported on the ship and adapted to be independently turned on their supports for setting them relative to the car, means for rotating the propellers, and automatically operating means actuated upon the tilting of the car either longitudinally or laterally for moving the propellers on their supports to set them for righting the ship.

61. In an air-ship, the combination of a car, propellers supported on the ship and adapted to be turned on their supports to set them for driving the ship in either direction, means for rotating the propellers, and means operating automatically upon tilting of the ship in traveling either forward or backward for setting the propellers to right the ship, said propellers being settable independently of said automatic means, and said automatic means being controllable from a central station on the car.

62. In an air-ship, the combination of a car, propellers supported on the ship and adapted to be turned on their supports to set them for driving the ship in either direction, means for rotating the propellers, and pendulum means operating automatically upon tilting of the ship in traveling either forward or backward for setting the propellers to right the ship, said propellers being settable independently of said automatic means, and said automatic means being controllable from a central station on the car.

63. In an air-ship, the combination of a car, propellers supported on the ship and adapted to be turned on their supports for setting them relative to the car, means for driving said propellers, separate motors for turning the propellers to set them, manually-controlled means for controlling said motors independently of each other, and automatically operating means operating upon tilting of the ship to set the propellers for righting the ship when the latter is traveling either forwardly or backwardly, said manually-controlled means and said automatic means being operative independently of each other.

64. In an air-ship, the combination of a car, propellers supported on the ship and adapted to be turned on their supports for setting them relative to the car, means for driving said propellers, separate motors for turning the propellers to set them, manually-controlled means for controlling said motors independently of each other, and automatically operating means operating upon tilting of the ship to set the propellers for righting the ship when the latter is traveling either forwardly or backwardly, said manually-controlled means and said automatic means being operative independently of each other, and both controllable from a central station on the car.

65. In an air-ship, the combination of a plane, a car connected therewith, propellers supported on the ship and arranged in a series extending longitudinally thereof, said propellers being separately movable on their supports for setting them independently of each other relative to the plane, means for driving said propellers, and automatically operating mechanism operating upon tilting of the ship to turn the propellers on their supports to right the ship, said propellers being settable on their supports independently of said automatic mechanism.

66. In an air-ship, the combination of a car, propellers supported on the ship at opposite sides of its longitudinal center and toward its opposite ends and intermediate the latter, said propellers being movable on their respective supports for setting them relative to the car, automatically operating means for moving the end propellers in opposite directions when the car tilts longitudinally, and automatically operating means for moving the intermediate propellers on their supports when the car tilts laterally, for the purpose set forth.

67. In an air-ship, the combination of a car, a propeller supported on the car toward each end thereof, an intermediate propeller supported on the ship to one side of the center of gravity of the car, said propellers being settable upon their supports for righting the ship when it tilts either laterally or longitudinally, means for driving the propellers, and means operating automatically upon tilting of the car either laterally or longitudinally for setting the propellers to right the ship.

68. In an air-ship, the combination of a car, propellers supported on the ship and adapted to be turned on their supports for setting them relative to the car for driving the ship either forwardly or rearwardly, means for driving the propellers, and automatically operating means operating, when the ship is being driven either forwardly or rearwardly to set the propellers relative to the car upon tilting the ship either longitudinally or laterally for righting the ship.

69. In an air-ship, the combination of a car, a propeller supported on the ship and adapted to be turned on its support to set it, means operating automatically upon tilting of the car for turning the propeller on its support for righting the car, and means for driving said propeller, said automatic means being constructed and arranged to permit the propeller to be turned at different angles with relation to the car without affecting the positioning of said automatic means.

70. In an air-ship, the combination of a car, a propeller supported on the ship and adapted to be turned on its support to set it, pendulum means operating automatically upon tilting of the car for turning the propeller on its support for righting the car, and means for driving said propeller, said automatic means being constructed and arranged to permit the propeller to be turned at different angles with relation to the car without affecting the positioning of said automatic means.

71. In an air-ship, the combination of a car, a propeller supported on the ship and adapted to be turned on its support to set it, means for driving the propeller, a motor operatively connected with said propeller for turning it on its support to set it, and means operating automatically upon tilting of the car for controlling the operation of the motor, said automatically operating means being constructed and arranged to permit the propeller to be turned at varying angles with relation to the car without affecting the positioning of said automatic means.

72. In an air-ship, the combination of a car, a propeller supported on the ship and adapted to be turned on its support to set it, means for driving the propeller, a motor operatively connected with said propeller for turning it on its support to set it, manually-controlled means for operating said motor, and automatically operating means for actuating said motor upon tilting of the car, said automatic means being constructed and arranged to permit said manually-controlled means to be actuated for setting the propellers at varying angles with respect to the car independently of said automatic means, for the purpose set forth.

73. In an air-ship, the combination of a car, propellers supported on the ship at opposite sides of the median line of the car, said propellers being settable independently of each other on their supports for varying the angles at which they extend relative to the car, separate motors for driving said propellers, and means operating automatically upon tilting of the ship to turn said propellers upon their supports for setting them to right the ship, for the purpose set forth.

74. In an air-ship, the combination of a car, a support on the ship, a propeller device formed of two spaced members provided with blades mounted on said support and diametrically opposed thereon, motors supported on and disposed at opposite sides of said support and movable with said propellers about said support, means extending longitudinally of said support and at opposite sides thereof for operating said propeller members from said motors, and means for moving said propeller members and motors therefor about said support, for the purpose set forth.

75. In an air-ship, the combination of a car, a propeller device formed of two spaced members provided with blades extending at opposite sides of said support, a pair of motors for driving said propeller members mounted on and extending at opposite sides of said support, means extending longitudinally of said support for driving said propeller members from said motors, said propellers and said motors being rotatable on said support, and gear-mechanism connecting said motors together.

76. In an air-ship, the combination of a support on the ship, a pair of propeller members and a pair of shafts journaled on said support at opposite sides thereof, said shafts extending longitudinally of said support, means operatively connecting one of said shafts with one of said propeller members, and the other of said shafts with the other of said propeller members, a power device mounted on said support to be rotatable thereon, and means operatively connecting said shafts together and operating to drive the latter from said power device.

77. In an air-ship, the combination of a support on the ship, a pair of propeller members and a pair of shafts journaled on said support and rotatable about the latter, said shafts extending longitudinally of said support, means operatively connecting one of said shafts with one of said propeller members, and the other of said shafts with the other of said propeller members, a pair of power devices mounted on and supported to extend at opposite sides of said support and operatively connected with said shafts, said power devices being rotatable about said support, and means connecting said shafts together to cause them to rotate simultaneously, for the purpose set forth.

78. In an air-ship, the combination of a car, a set of propellers supported on the shaft and adapted to be turned on their supports for setting them relative to the car, means for driving the propellers, a source of fluid-pressure supply, a fluid-pressure motor for each propeller for moving it on its support to set it, separate valves for controlling the flow of said pressure to the motors, pendulum-actuated means operated automatically upon tilting of the car to operate said valves for righting the ship, and manually-controlled means for actuating the valves, operating independently of said pendulum-controlled means, for effecting the setting of the propellers independently of each other.

79. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, a series of conduits leading from the fluid-pressure supply to said motors, a set of coöperating valves for the conduits leading to each motor for controlling the supply of fluid-pressure thereto, manually-operated means for operating a valve of each set, and means operated automatically upon tilting of the car to actuate the other valves of said sets, for the purpose set forth.

80. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, a plurality of conduits leading from said supply to each of said motors, a set of coöperating valves for said conduits, one of the valves of each set being operative to direct the air through either of its coöperating conduits and movable into a position for permitting fluid-pressure controlled by the other valves of said sets to pass through them, means for manually operating the said air-directing valves of each set, and means operated automatically upon tilting of the car to actuate the other valves of said sets, for the purpose set forth.

81. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, conduits leading from said supply to said motors, a set of coöperating valves for the conduit leading to each motor, the valves of said sets nearest to the motors each being constructed and arranged to direct air into either of a plurality of coöperating conduits for operating the motors in opposite directions and provided with cross-ports forming a continuation of said conduits, and the others of said valves being constructed and arranged to control the flow of fluid-pressure into said conduits, manually-controlled means for actuating the valves nearest to the motors, and means operated automatically upon tilting of the car to actuate the others of said valves, for the purpose set forth.

82. In an air-ship, the combination of a car, a set of propellers supported on the ship and adapted to be turned on their supports for setting them relative to the car, means for driving the propellers, a source of fluid-pressure supply, a fluid-pressure motor for each propeller for moving it on its support to set it, a set of conduits for each motor leading thereto from said supply, a rotary slide-valve for each set of conduits constructed and arranged when adjusted into different positions to permit fluid-pressure to flow into one or the other of the conduits of each set and when adjusted into another position to form a continuation of the conduits coöperating therewith, valves for each set of conduits coöperating with said first-named valves and operative to permit fluid-pressure to enter either of the conduits with which they coöperate, manually-controlled means for actuating said first-named valves, and automatically-operating means for actuating said second-named valves upon tilting of the car, for the purpose set forth.

83. In an air-ship, the combination of a car, a plurality of propellers supported on the ship and adapted to be turned on their supports for setting them relative to the car, means for driving the propellers, and pendulum-operated means constructed and arranged to be actuated upon tilting of the car for setting certain of the propellers when the ship tilts laterally and others of the propellers when the ship tilts longitudinally.

84. In an air-ship, the combination of a car, a plurality of propellers supported on the ship and adapted to be turned on their supports for setting them relative to the car, means for driving the propellers, fluid-pressure motors for turning said propellers on their supports to set them, and automatically-operated means constructed and arranged to be actuated upon tilting of the car for causing certain of the motors to operate for turning certain of the propellers on their supports to set them when the ship tilts laterally and others of the said motors to operate for turning others of the propellers on their supports to set them when the ship tilts longitudinally.

85. In an air-ship, the combination of a car, a propeller supported on the ship to adapt it to be rotated and moved on its support for changing its position with relation to the car, a source of fluid-pressure supply, a fluid-pressure motor for moving said propeller in either direction upon its support, a plurality of conduits leading from said supply to the motor, a set of valves in said conduits for controlling the flow of fluid-pressure to said motor, one of the valves of said set being constructed and arranged to be operated to permit of the flow of fluid-pressure through either of the conduits to said motor and formed with cross-ports and straight-ports for communicating with said conduits, and the other of said valves being constructed and arranged to be operated to permit fluid-pressure to flow to said motors through the ports in said port-equipped valve, means for manually-operating the first-referred-to valve of said set, and means operating automatically upon tilting of the car to actuate the second-referred-to valve of said set.

86. In an air-ship, the combination of a car, propellers supported on the ship and adapted to be turned on their supports for setting them relative to the car, means for driving said propellers, separate fluid-pressure motors for turning the propellers to set them, manually-controlled means for controlling said motors independently of each other, and automatically-operating means operating upon tilting of the ship to set the propellers for righting the ship when the latter is traveling either forwardly or backwardly, said manually-controlled means and said automatic means being operative independently of each other.

87. In an air-ship, the combination of a car, propellers supported on the ship and adapted to be turned on their supports for setting them relative to the car, means for driving said propellers, separate fluid-pressure motors for turning the propellers to set them, manually-controlled means for controlling said motors independently of each other, and automatically-operating means operating upon tilting of the ship to set the propellers for righting the ship when the latter is traveling either forwardly or backwardly, said manually-controlled means and said automatic means being operative independently of each other and both controllable from a central station on the car.

88. In an air-ship, the combination of a car, propellers supported on the ship and movable independently of each other on their supports, separate power-devices for turning said propellers on their supports for setting them, a source of power for operating said power-devices, means for driving said propellers, and means controllable from a central station on the car, for controlling the supply of the power from said source thereof to said power-devices for independently controlling the operation of the latter to right the ship when it tilts either longitudinally or laterally.

HERMAN LEINEWEBER.

In presence of—
W. B. DAVIES,
A. U. THORIEN.